United States Patent [19]
Oshiro et al.

[11] Patent Number: 6,010,324
[45] Date of Patent: Jan. 4, 2000

[54] MOLD CLAMPING UNIT AND METHOD OF POSITIONING MOLD IN MOLD CLAMPING UNIT

[75] Inventors: Takeo Oshiro; Masao Hirosawa; Hideo Ichikawa, all of Shizuoka-ken, Japan

[73] Assignee: Toshiba Kikai Kabushiki Kaisha, Tokyo, Japan

[21] Appl. No.: 08/787,006

[22] Filed: Jan. 29, 1997

[30] Foreign Application Priority Data

| Jan. 30, 1996 | [JP] | Japan | 8-014360 |
| Apr. 26, 1996 | [JP] | Japan | 8-107613 |
| Jul. 26, 1996 | [JP] | Japan | 8-198058 |
| Oct. 9, 1996 | [JP] | Japan | 8-268741 |

[51] Int. Cl.⁷ ................................................ B29C 45/26
[52] U.S. Cl. ...................... 425/186; 425/192 R; 425/547; 425/595
[58] Field of Search ................................ 425/186, 190, 425/192 R, 595, 547

[56] References Cited

U.S. PATENT DOCUMENTS

| 4,202,522 | 5/1980 | Hanas et al. | 425/186 |
| 4,416,604 | 11/1983 | Bender et al. | 425/186 |
| 4,462,783 | 7/1984 | Hehl | 425/186 |
| 4,473,346 | 9/1984 | Hehl | 425/186 |
| 4,518,338 | 5/1985 | Hehl | 425/186 |
| 4,529,371 | 7/1985 | Nickley | 425/186 |
| 4,555,228 | 11/1985 | Nishiike et al. | 425/186 |
| 4,702,685 | 10/1987 | Fruntzek | 425/186 |
| 4,805,285 | 2/1989 | Reyes | 425/186 |
| 4,810,181 | 3/1989 | Ozawa | 425/595 |
| 4,810,182 | 3/1989 | Groll | 425/595 |
| 4,867,666 | 9/1989 | Brizio et al. | 425/595 |
| 5,096,404 | 3/1992 | Janos et al. | 425/595 |
| 5,282,733 | 2/1994 | Noritake et al. | 425/192 R |
| 5,333,369 | 8/1994 | Miyairi et al. | 425/186 |

*Primary Examiner*—James P. Mackey
*Attorney, Agent, or Firm*—Finnegan, Henderson, Farabow, Garrett & Dunner, L.L.P.

[57] ABSTRACT

A mold clamping unit comprises guide rollers for guiding fitting and releasing of a mold, a hydraulic clamp for holding the mold at a molding position, a guiding portion formed to project in a direction perpendicular to a mold open-close direction from a lower portion of platen and a locking mechanism provided to an upper portion opposing to the guiding portion for the platen, for locking the mold at a releasing position. Since exchange and maintenance operations of a stamper can be carried out under a condition where the mold is released to the releasing position over the guiding portion and locked by the locking mechanism, fitting/releasing of the mold to/from the platen can be facilitated and exchange and maintenance operations of the stamper can be made easy.

20 Claims, 25 Drawing Sheets

MOLD CLAMPING UNIT AND METHOD OF POSITIONING MOLD IN MOLD CLAMPING UNIT

BACKGROUND OF THE INVENTION

The present invention relates to a mold clamping unit and, more particularly, a mold clamping unit for precision injection molding machine which has a small motion stroke of a movable platen and which is applied to molding of an optical disc such as at a compact disc or digital video disc.

In the precision injection molding machine of this kind, a movable platen (die plate) which holds a movable mold is caused to advance to a stationary platen (die plate) which holds a stationary mold, then a mold is closed and clamped, then a nozzle is caused to touch the mold, then melted resin is injected to the mold cavity, and then the injection side of the molding machine is retreated and the clamping side of the molding machine is opened to take out molded articles. A stamper is attached to the stationary mold and/or the movable mold when an optical disc is molded.

In the prior art, if there is necessity of effecting exchange and/or maintenance operation of the stamper, these operations are executed while the mold is poen.

However, in the mold clamping unit for the precision injection molding machine in the prior art, with taking account of extension of the whole length of the molding machine if a motion stroke of the movable platen is made long, in most cases the motion stroke of the movable platen is set to a minimum value required for molding. Therefore, a gap between the movable platen and the stationary platen in a mold opening state is not sufficient to carry out exchange and maintenance operation of the stamper. Consequently, there has been such a drawback that these operation become troublesome to thus take much time and labor.

SUMMARY OF THE INVENTION

The present invention has been made to overcome the above problems, and it is an object of the present invention to provide a mold clamping unit capable of carrying out fitting/releasing of a mold into/from a platen easily and also facilitating exchange and maintenance operations of a stamper.

According to an aspect of the present invention, there is provided a mold clamping unit comprising: a stationary platen for holding a stationary mold; a movable platen for holding a movable mold, the movable platen being arranged in opposition to the stationary platen; an open-close mechanism for making the movable platen move in a direction toward and away from the stationary platen, causing the movable mold to perform an open-close action to the stationary mold; a mold clamping mechanism provided for at least one of the platens for clamping the molds, as they are closed by the open-close mechanism; and a mold attachment mechanism provided for said one of the platens for detachablly attaching a corresponding one of the molds to a molding position thereof predetermined to said one of the platens, allowing a movement of the corresponding mold from the molding position in a crossing direction to a direction of the open-close action.

According to this structure, fitting, maintaining, and releasing of the stationary mold or the movable mold can be carried out by the mold attaching and detaching mechanism which is provided of the stationary mold or the movable mold.

In other words, fitting and maintaining of the mold can be carried out by moving the movable platen into the opening direction, moving the mold along the mold shifting direction intersecting with the open-close direction of the movable platen, and holding the mold at the molding position. Releasing of the mold can be carried out by releasing hold of the mold at the molding position, and moving the mold from the molding position to the releasing position along the mold shifting direction.

Accordingly, even if a moving stroke of the movable platen is small, fitting and releasing of the mold can be done. In addition, since releasing position of the mold is out of moving locus of the movable platen, the mold can be pulled out to a position which has little interference with other members and various operations such as stamper exchange can be effected there. After stamper exchange, the mold can be mounted at the molding position again according to the operation similar to those in fitting the mold. The mold can be removed from the platen at the releasing position to exchange the mold as a whole.

In this manner, even if the moving stroke of the movable platen is suppressed small, the mold can be fitted and released. Since the mold can be pulled out to the releasing position which has little interference with other members, stamper exchange and maintenance operations can be executed easily.

In the preferred embodiment, the mold attachment mechanism comprises: a guiding mechanism extending from a lower portion of said one of the platens in a substantially perpendicular crossing direction to the direction of the open-close action, for supporting the corresponding mold from below, so as to guide the corresponding mold while it is drawn out from the molding position and fitted into the molding position; a clamping mechanism provided for upper and lower portions of said one of the platens for clamping upper and lower edge portions of the corresponding mold at the predetermined molding position; and a locking mechanism provided for said one of the platens, so as to lock the corresponding mold drawn out the molding position at a predetermined releasing position.

Further, in the preferred embodiment, the guiding mechanism comprises a plurality of guide rollers; said one of the platens has a guiding portion formed on a side edge portion thereof serving as fitting and releasing sides of the corresponding mold, the guiding portion extends in the substantially perpendicular crossing direction to the direction of the open-close action; the guiding portion has the plurality of guiding rollers mounted thereon; and the locking mechanism is provided on an upper portion of the corresponding platen in opposition to the guiding portion.

According to this structure, fitting, maintaining, and releasing of the mold can be carried out manually.

In other words, in the state where the clamping means and the locking means are released, the mold is mounted on the guiding portion and is slid on the guide rollers by pushing in manually, so that the mold can be fitted in the mold shifting direction substantially perpendicular to the open-close direction of the mold. After reaching the molding position according to this fitting, the mold can be clamped by the clamping means to fit to the platen.

The mold being mounted can be slid on the guide rollers by releasing the clamping means and pulling it out manually in the opposite direction to the fitting direction. According to this pulling-out, the mold can be locked by the locking means and be held at the releasing position when it reaches the releasing position over the guiding portion, and stamper exchange, for example, can be done. Like this, since the releasing position of the mold is set on the guide portion, which has little interference with other members, operations such as stamper exchange can be facilitated. After stamper exchange, the locking means is released, and the mold can be mounted at the molding position again according to the operation similar to those in fitting the mold.

Further, the mold can be removed from the platen by releasing the clamping means and the locking means and then being pulled out manually. The mold can be exchanged as a whole by such removing of the mold.

Therefore, the mold can be fitted and released easily by sliding on the guide rollers. Upon stamper exchange and maintanance operations, the mold can be pulled out to the releasing position on the guide portion which has little interference with other members. In addition, the mold at the releasing position can be held stably by the locking means. Hence, stamper exchange and maintanance operations can be facilitated.

In the preferred embodiment, the mold attachment mechanism has a stopper pin provided on a projected end side of the guiding portion, the pin preventing overrun of the corresponding mold exceeding the releasing position by projecting on a releasing and fitting line of the corresponding mold, and permitting releasing and fitting of the corresponding mold by withdrawing from the releasing and fitting line.

According to this structure, the stopper pin of the stopper mechanism is projected through the fitting and releasing lines of the mold to prevent overrun of the mold beyond the releasing position when the mold being pulled out from the molding position is to be held at the releasing position by the locking means.

The stopper pin is retreated from the fitting and releasing lines, so that it in no way disturbs releasing of the mold from the platen by pulling-out of the mold and fitting of the mold upon mounting the mold on the platen.

Accordingly, holding of the mold at the releasing position can be ensured by the stopper mechanism, which prevents overrun of the mold beyond the releasing position in pulling out the mold from the molding position, nevertheless it is done manually. As a result, stamper exchange and maintenance operations can be made easy.

In the preferred embodiment, the locking mechanism has a lock pin and a projection portion, the lock pin is vertically movable by a manual operation, so as to abut to an upper edge surface of the corresponding mold positioned at the releasing position when the lock pin moves downwardly, and to hold the corresponding mold in its downwardly pressed state, the projection portion prevents fall-down of the corresponding mold at the predetermined releasing position.

According to this structure, the locking means can lock and release the mold by moving the locking pin manually. Such locking and releasing can be carried out in a stable state because the projection prevents falling-down of the mold.

Therefore, since the locking means with the manual locking pin is employed, incidental equipment such as pipings or/and wirings can be neglected. As a result, the mold clamping unit can be designed in a compact form and at low cost. Furthermore, by preventing falling of the mold at the releasing position by means of the projection of the locking means, locking operation of the mold can be executed stably and easily by the locking means.

In the preferred embodiment, said one of the platens has a stopper provided thereon, the stopper limits movement of the corresponding mold by abutting to a side edge portion of the corresponding mold, as the corresponding mold is fit.

According to this structure, since the mold can be positioned by abutting to the stopper and then mounted, the mold can be mounted easily and firmly at the molding position at which the axial center of the mold coincides with the axial center of other mold. Hence, this unit can be applied suitably to the precision injection molding machine.

In the preferred embodiment, the mold attachment mechanism comprises: a guiding mechanism extending from a lower portion of said one of the platens in a substantially perpendicular crossing direction to the direction of the open-close action, for supporting the corresponding mold from below, so as to guide the corresponding mold while it is carried out of and carried into the molding position; a clamping mechanism provided for upper and lower portions of said one of the platens, for clamping upper and lower edge portions of the corresponding mold at the predetermined molding position: and a mold displacing mechanism provided for said one of the platens to be connected detachably to the corresponding mold, for displacing shifting the corresponding mold along the guiding mechanism.

In the preferred embodiment, the guiding mechanism comprises a plurality of guide rollers.

According to this structure, after clamping of the clamping means is released, the mold is guided on the plurality of guide rollers by the moving cylinder and is slid to be pulled out from the fitting position to the platen, and the mold is guided and slid on the plurality of guide rollers by the moving cylinder and is fitted into the platen and is then clamped by the clamping means.

In other words, since fitting and releasing of the mold to and from the platen can be automated by the moving cylinder, stamper exchange and maintenance operations can be facilitated.

In the preferred embodiment, the clamping mechanism comprises a hydraulic clamp or an electromagnetic clamp.

According to this structure, since attaching and detaching of the mold to and from the platen can be automated by the automatic clamping means such as hydraulic clamps, electromagnetic clamps, etc., stamper exchange and maintenance operations can be facilitated.

In the preferred embodiment, said one of the platens has a guiding portion formed on a side edge portion thereof to carry the mold out and in serving as, the guiding portion extends in the substantially perpendicular crossing direction to the direction of the open-close action; the guiding portion has the plurality of guiding rollers mounted thereon.

According to this structure, since fitting start position and releasing end position of the mold to and from the platen can be set on the guiding portion which extends remotely from the the side edge portion of the platen, fitting and releasing between the mold and the moving cylinder can be made easy much more. Therefore, stamper exchange and maintenance operations can be facilitated.

In the preferred embodiment, the mold clamping unit further comprising: a piping system provided for a frame in which the stationary platen and the movable platen are arranged in opposition to each other: the piping system for flowing through medium used to control mold temperature; a flexible hose for connecting the corresponding mold and the piping system, having a looseness in its middle portion: and a spring provided between the flexible hose and the frame, for absorbing the looseness According to this structure, the mold can be slid in the direction intersecting with the mold open-close direction of the mold while the flexible hoses for controlling temperature of the mold are connected to the mold.

In other words, the flexible hoses have their maximum slack amount when the mold is mounted on the molding position in normal operation. By absorbing the slack amount by tensile force of the spring, interference of the flexible hoses with other members can be avoided.

More particularly, when the mold is pulled out from the molding position to the releasing position or when the mold is pulled in from the releasing position to the molding position, the flexible hose is pulled out against a tensile force of the spring to reduce the slack amount. On the contrary, when the mold is fitted in from the releasing position to the molding position, the flexible hose is pulled in according to the tensile force of the spring to increase the slack amount. In this manner, since the tensile force of the spring is always applied to the flexible hose when the mold is slid upon fitting and releasing, slack of the flexible hose which causes interference with other members inadvertently can be avoided, so that smooth slide of the mold can be assured.

Accordingly, fitting and releasing of the stationary mold can be done while the flexible hose is being connected to the mold when there is necessity of carrying out exchange of the stamper and/or other maintenance operations. Therefore, attaching and detaching operations of the flexible hose to and from the mold can be neglected in fitting and releasing the mold. For this reason, stamper exchange and maintenance operations can be made more easily.

In the preferred embodiment, the piping system is provided for the frame via a supporting member which has a thermal insulating material surface.

According to this structure, since fitting portions of the piping system are protected with thermal insulating material, the surface of the fitting portions can be prevented from exposure to high temperature even if temperature of the temperature controlling medium flowing through the piping system is high. As a result, safety in operation and improvement in operation efficiency can be achieved.

In the preferred embodiment, another mold attachment mechanism is provided for the other of the platens, said mold clamping unit further comprises: a first positioning stopper provided for said one of the platens, for limiting a moving limit of the corresponding mold by abutting to a side edge portion of the corresponding mold, as the corresponding mold is fit; a second positioning stopper provided for the other of the platens has for temporally limiting a moving limit of the other corresponding mold, being ahead of a predetermined molding position in the other corresponding mold fitting direction, by abutting to a side edge portion of the other corresponding mold, as the other corresponding mold is fit; and a centering mechanism for centering the molds by moving said other mold to the predetermined molding position when the movable platen is caused to advance to the stationary platen under a condition where said one mold is positioned by the first positioning stopper and held by the mold attachment mechanism at the predetermined molding position and said other mold is positioned temporarily by the second positioning stopper.

According to this structure, one of the stationary mold and the movable mold is positioned by abutting to the positioning stopper provided to corresponding platen. In a state where one of the molds is fixed and held by the mold attaching and detaching mechanism which being provided to the corresponding platen, other mold is moved forwardly in the mold fitting direction to abut to the temporarily positioning stopper provided to the corresponding platen and then temporally positioned. After this, the movable platen is advanced toward the stationary platen, and then other mold being temporarily positioned is moved to one mold being positioned by the centering mechanism provided between both molds to be located at the regular opposing position, so that centering between both molds can be carried out automatically.

Therefore, centering of the molds can be assured. Upon molding, scoring of the mold can be prevented and therefore molding operation can be carried out with good precision.

In the preferred embodiment, the first stopper includes a magnet on part of its contact surface contacting to said one mold to form an identical surface to said contact surface.

According to this structure, since one of the molds can abut surely and tightly to the contact surface of the stopper main body, positioning of the mold can be carried out with high precision.

In the preferred embodiment, the second stopper includes a magnet on part of its contact surface contacting to said other mold.

According to this structure, when centering of both molds is effected by moving the movable platen close to the stationary platen, other mold being temporarily positioned is separated from the magnet, and maintenance operation of the temporarily positioned state and moving operation of the mold from the temporarily positioned state can be executed firmly to coincide with axial centers of the molds.

BRIEF DESCRIPTION OF TH DRAWINGS

DESCRIPTION OF THE PREFERRED EMBODIMENTS

First, a first embodiment of the present invention will be explained with reference to FIGS. 1 to 6 hereinbelow.

Figure 1:
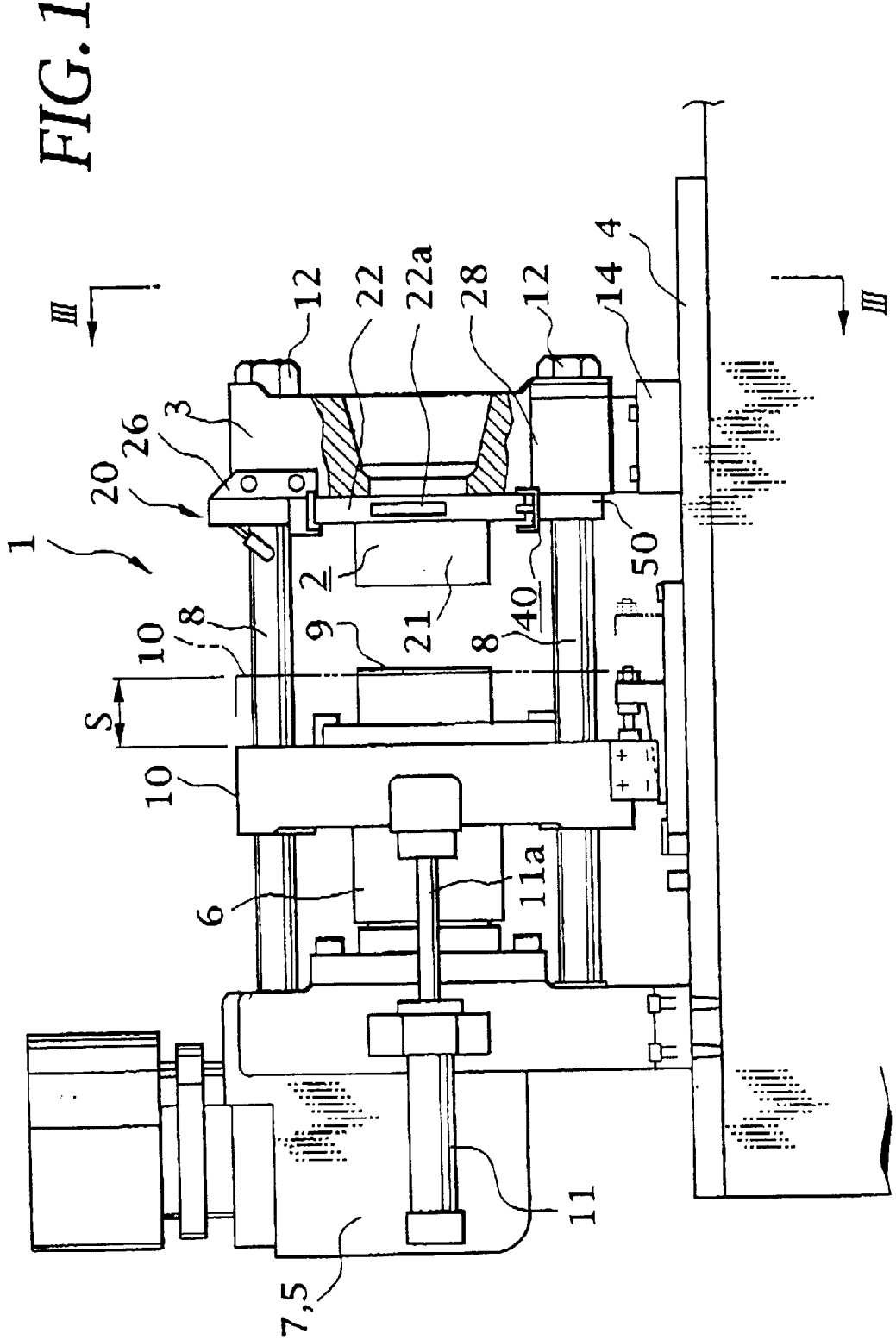
FIG. 1 Is a side view, partially in section, showing a mold clamping unit according to a first embodiment of the present invention.
Figure 2:
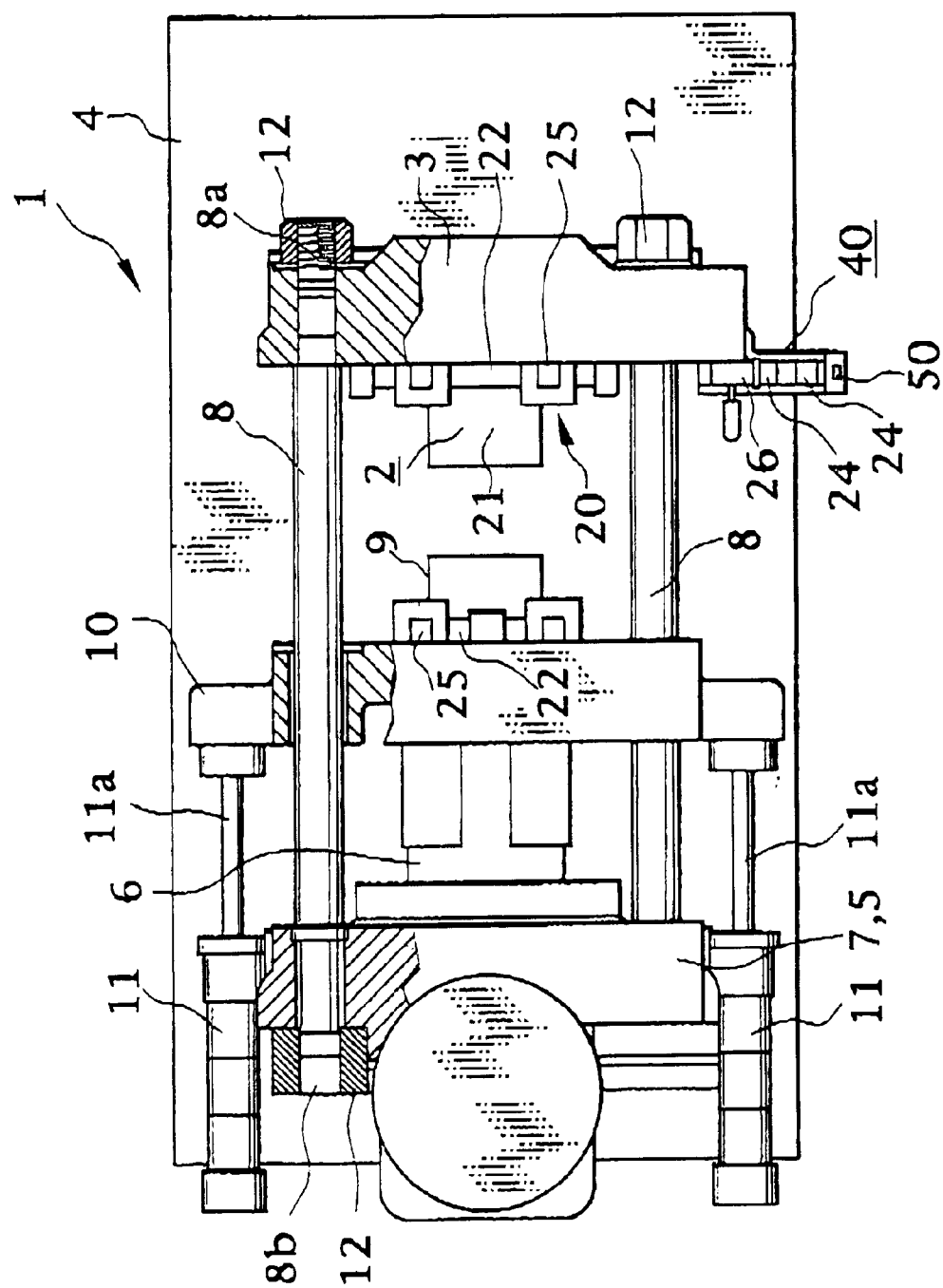
FIG. 2 is a plan view, partially in section, showing the mold clamping unit in FIG. 1.
Figure 3:
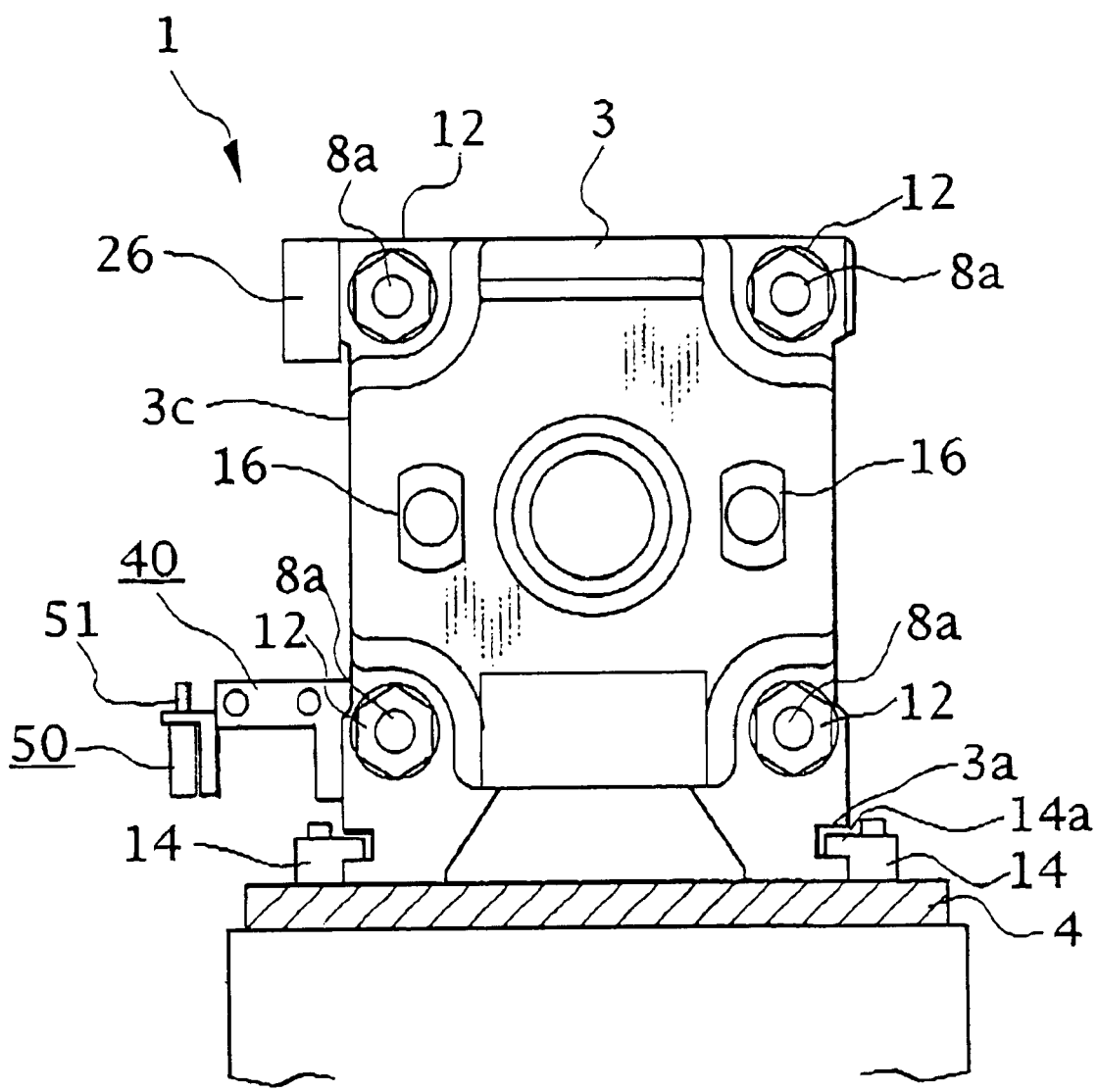
FIG. 3 is a sectional view showing the mold clamping unit taken along a line III—III in FIG. 1.

FIGS. 1 to 3 show a mold clamping unit 1 according to a first embodiment of the present invention wherein a stamper is attached to the stationary side.

The mold clamping unit 1 comprises in brief a stationary platen 3 for holding a stationary mold 2. a movable platen 10 for holding a movable mold 9, a cylinder support 7 in which a mold cylinder 5 serving as a mold clamping mechanism is built, and mold open-close cylinders 11 provided to the cylinder support 7 and serves as an open-close mechanism.

The stationary platen 3 is mounted on a frame 4 and installed movably in a mold open-close direction by engaging projections 14a of retaining members 14, which are fixed to the frame 4, with recess portions 3a formed on lower ends on both sides (see FIG. 3). The stationary platen 3 is also connected to the cylinder support 7, which is fixed on the frame 4, via four tie-rods 8. At this time, the tie-rods 8, at one end are inserted into the stationary platen 3 and are fixed with nuts 12(see FIGS. 2 and 3). Other ends of the tie-rods 8 are inserted into the cylinder support 7 and are fixed with the nuts 12(see FIG. 2).

The stationary platen 3 is equipped with a mold attaching and detaching mechanism 20, and the stationary mold 2 is held detachably by this mold attaching and detaching mechanism 20.

Four tie-rods 8 are passed through through holes formed at four corners of the movable platen 10 (see FIG. 2) to enable the movable platen 10 to be moved along the tie-rods 8. The movable platen 10 is connected to a clamping ram 6 of the mold cylinder 5 and is moved close to the stationary platen 3 (i.e., mold closing direction) and away from the stationary platen 3 (i.e., mold opening direction) by the mold open-close cylinders 11. Two mold open-close cylinders 11 are provided on each of both sides of the cylinder support 7 in a middle area and are connected to the movable platen 10 via respective cylinder rods 11a. In some cases, the mold open-close cylinders 11 are built in the cylinder support 7.

In FIG. 3, a reference 16 denotes a connection hole for a cylinder rod of a nozzle touch cylinder (not shown) provided on the injection side.

Figure 4:
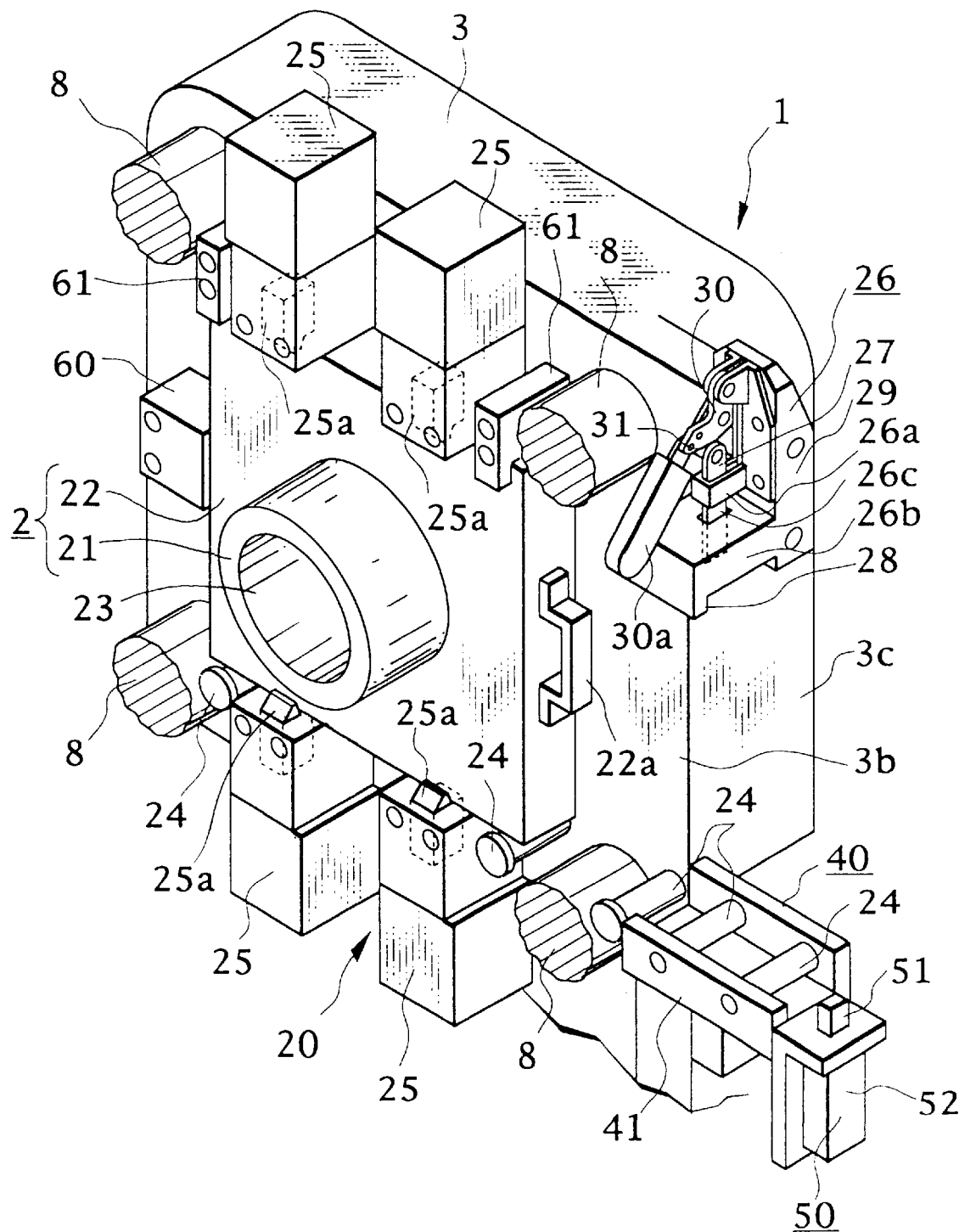
FIG. 4 is a perspective view showing a pertinent portion of the mold clamping unit in FIG. 1.

As shown in FIG. 4, the mold attaching and detaching mechanism 20 comprises a plurality of guide rollers 24, 24, . . . provided on a surface 3b of the stationary platen 3 opposing to the movable platen 10 along a direction substantially perpendicular to said open-close direction, for guiding releasing and fitting of the stationary mold 2, hydraulic clamps 25, 25, . . . provided to the stationary platen 3 as a clamping means, for clamping the stationary mold 2 at a molding position, a guiding portion 40 projected from a lower side edge portion 3c of the stationary platen 3, which serves as a releasing and fitting side for the stationary mold 2, in the direction perpendicular to the mold open-close direction, and a locking means 26 provided on an upper portion opposing to the guiding portion 40, for locking the stationary mold 2 at a release position.

The stationary mold 2 is made up of a mold main body 21, and a supporting plate 22 to which the mold main body 21 is attached. A stamper 23 is mounted on a front surface of the mold main body 21, and a releasing handle 22a is furnished to a side edge portion of the supporting plate 22.

The hydraulic clamps 25 are provided on upper and lower portions of the opposing surface 3b of the stationary platen 3, in which engaging pawls 25a are provided to project and retreat by virtue of hydraulics. The stationary mold 2 is held at a molding position on the stationary platen 3 by clamping upper and lower edge portions of the supporting plate 22 by projected engaging pawls 25a. The upper hydraulic clamps 25 for clamping upper edge portions of the supporting plate 22 are provided between the tie-rods 8, 8 while the lower hydraulic clamps 25 for clamping lower edge portions of the supporting plate 22 are provided between the guide rollers 24, 24. The hydraulic clamps 25 are provided to attach and detach the stationary mold 2 automatically and other automatically clamping means such as electromagnetic clamps may be employed in place of the hydraulic clamps 25 if they have above function. The electromagnetic clamps can automate attaching and detaching of the stationary mold 2 by virtue of excitation and deexcitation.

The guiding portion 40 consists of a groove portion 41 having a U-shape, and guide rollers 24 provided between both side walls of the groove portion 41. The guiding portion 40 is projected to direct its groove direction in the direction substantially perpendicular to the mold open-close direction.

Figure 5A:
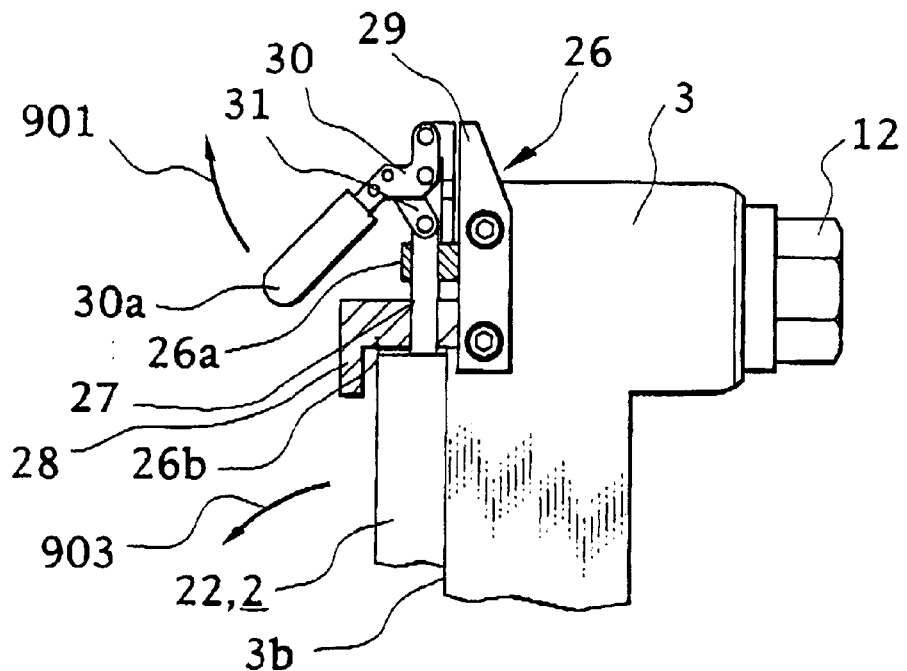
FIG. 5A is a view illustrating a locked state of a locking means in the mold clamping unit in FIG. 1.
Figure 5B:
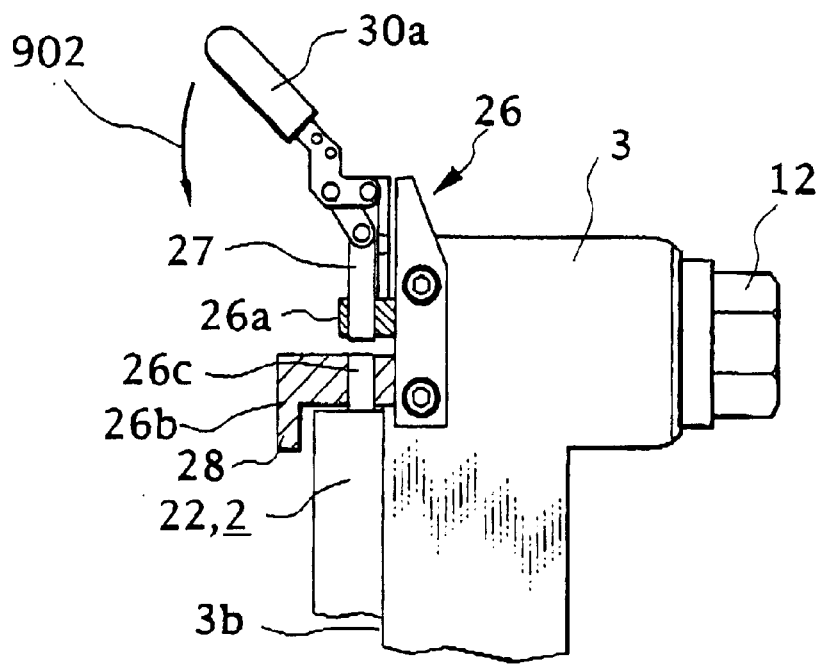
FIG. 5B is a view illustrating a released state of the locking means in the mold clamping unit in FIG. 1.

As shown in FIGS. 5A and 5B, the locking means 26 consists of a locking pin 27 provided movably in the axial direction manually, and a projection 28 for preventing fall of the stationary mold 2 (movement indicated by an arrow 903

In FIG. 5A). The locking pin 27 is connected a supporting bracket 29 fixed to the stationary platen 3, via a bell crank 30 and a connection arm 31. The locking pin 27 is moved in the axial direction along a guide cylinder portion 26a of the supporting bracket 29 by moving a handle 30a of the bell crank 30 upwardly or downwardly in the direction indicated by an arrow 901 or 902.

The projection 28 is formed as a lower projection of the projection 26b on the projection end side, the projection 26b being formed to project toward the movable platen 10 from the supporting bracket 29. In this manner, the projection 28 is positioned to oppose to an uppermost edge portion of the supporting plate 22 on the stationary mold 2, so that the projection 28 can prevent fall-down of the stationary mold 2 since an upper edge of the supporting plate 22 abuts to the projection 28 when the supporting plate 22 falls down in the opposite direction to the movable platen 10 (i.e., the direction 903). A through hole 26c is cut through the projection 26b to insert the locking pin 27.

FIG. 5A shows a locked state of the locking means 26. The locking pin 27 abuts to an upper end surface of the supporting plate 22 for the stationary mold 2 to press the supporting plate 22 downwardly, so that the supporting plate 22 is sandwiched between the locking pin 27 and the guide rollers 24 in the guide portion 40 to hold the stationary mold 2 at a releasing position.

FIG. 5B shows a released state of the locking means 26. The locking pin 27 can be moved upwardly and downwardly by rotating the handle 30a in a locked state (FIG. 5A) in the direction 901. As a result, the locking pin 27 can be separated from an upper surface of the supporting plate 22, thereby achieving a released state. In order to shift the supporting plate 22 from its released state to its locked state, the locking pin 27 is moved downwardly by rotating the handle 30a in the released state (FIG. 513) in the direction 902. As a result, the locking pin 27 is passed through the through hole 26c of the projection 26b to abut to an upper end surface of the supporting plate 22, thereby achieving a locked state (FIG. 5A).

Preferably, the mold attaching and detaching mechanism 20 may be equipped with a stopper mechanism 50 in place of the mere stopper member.

As shown in FIG. 4, the stopper mechanism 50 includes a stopper pin 51 which is provided on the projection end side of the guide portion 40. The stopper pin 51 is so formed that it can prevent overrun of the stationary mold 2 beyond a releasing position when it projects through fitting and releasing lines of the stationary mold 2 and also can permit the stationary mold 2 to be fitted and released when it retreats from the fitting and releasing lines.

Figure 6:
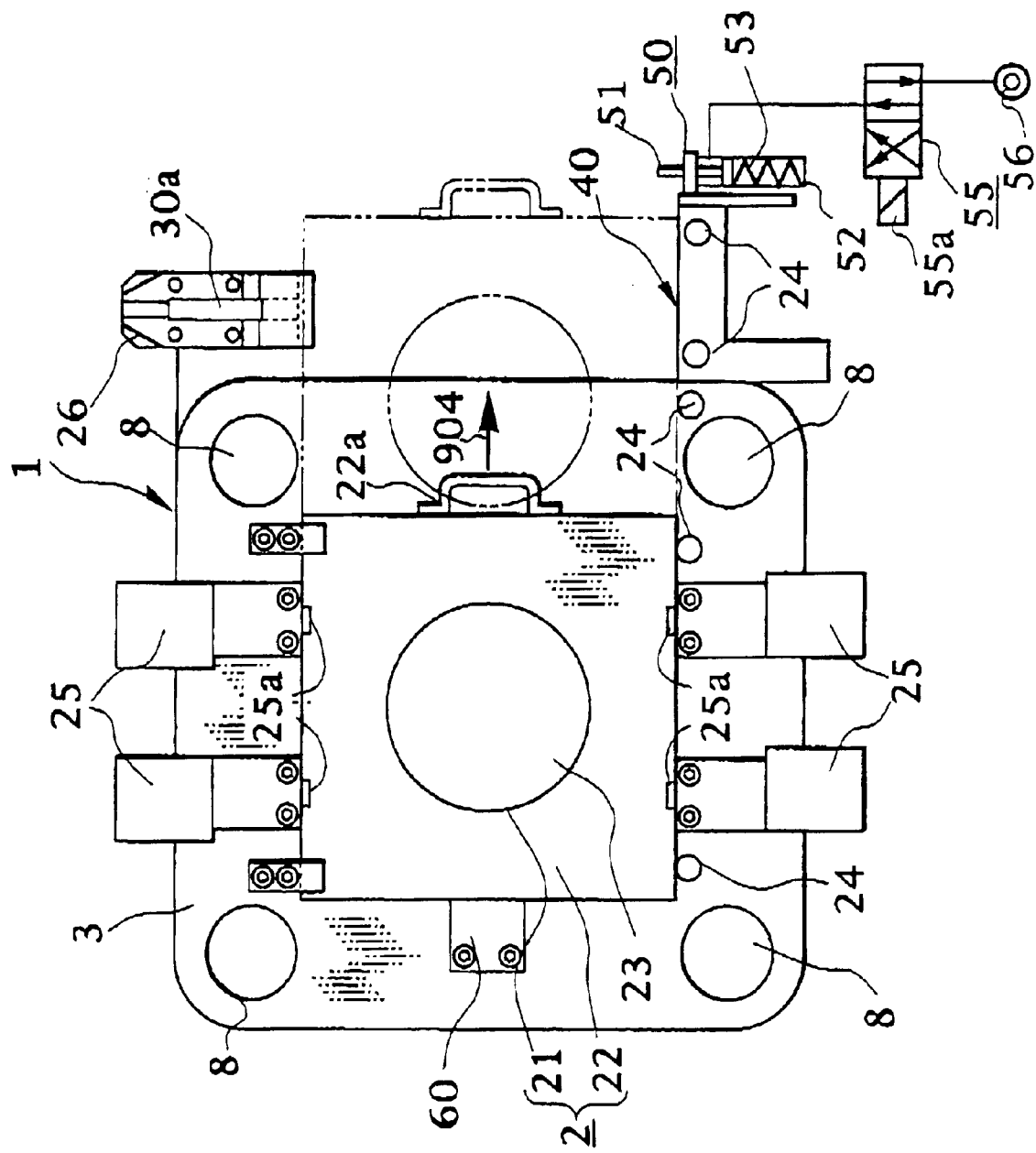
FIG. 6 is a view illustrating an operation of the mold clamping unit in FIG. 1.

As shown in FIG. 6, for example, the stopper mechanism 50 further includes a spring 53 installed in a cylinder 52 for thrusting the stopper pin 51 forwardly, and a solenoid valve 55 for supplying and exhausting compressed air to and from an air chamber in the cylinder 52. The solenoid valve 55 is connected to an air source 56.

According to the stopper mechanism 50, when a solenoid 55a of the solenoid valve 55 is in a ON state, an air is supplied to the air chamber of the cylinder 52, so that the stopper pin 51 is retreated into the cylinder 52 against a spring force of the spring 53 and then it is removed from the fitting and releasing lines of the stationary mold 2. On the contrary, when the solenoid 55a of the solenoid valve 55 is in a OFF state or when the air source 56 is turned off while the solenoid 55a is in a ON state, air is exhausted from the air chamber of the cylinder 52, so that the stopper pin 51 is fed forward by the spring force of the spring 53 to project through the fitting and releasing lines of the stationary mold 2.

The stopper mechanism 50 causes the solenoid 55a to turn ON to thus retreat the stopper pin 51 from the fitting and releasing lines when an overall mold is exchanged by releasing the stationary mold 2 from the stationary platen 3 completely. In remaining cases, the stopper mechanism 50 causes the stopper pin 51 to be projected through the fitting and releasing lines by the spring force of the spring 53 when stamper exchange and other maintenance operations, for example are to be carried out.

Preferably, the mold attaching and detaching mechanism 20 is equipped with a stopper 60.

The stopper 60 is formed to project from the opposing surface 3b of the stationary platen 3 such that it limits a moving limit of the stationary mold 2 in fitting the stationary mold 2 by abutting to a side edge portion of the supporting plate 22.

In FIG. 4, a reference 61 denotes a guide member into which upper edge portions of the supporting plate 22 are fitted to guide movement of the stationary mold 2. The guide member is formed to have a substantial L-shape and to project on the opposing surface 3b of the stationary platen 3.

An operation of the mold clamping unit 1 having the mold attaching and detaching mechanism 20 constructed as above will be explained in the following.

After the molds are closed by the mold open-close cylinder 11, they are clamped by applying tensile force to the tie-rods 8 by virtue of the mold cylinder 5. After mold clamping, an injection side (not shown) is advanced to the stationary platen 3 side to make the nozzle (not shown) contact with the mold, then melted resin is injected into a mold cavity to execute injection molding. After injection molding is finished, the injection side is retreated from the stationary platen 3 and then the mold is opened by the mold open-close cylinder 11 and the mold cylinder 5 to take out molded articles. The mold clamping unit 1 is normally operated via a series of above operations. In normal operation, the movable platen 10 is caused to advance to and retreat from the stationary platen 3 with a stroke S, as shown in FIG. 1.

In normal operation, the stationary mold 2 is held at a molding position of the stationary platen 3 while, as indicated by a solid line in FIGS. 4 and 6, a side edge portion of the supporting plate 22 is rendered to abut to the stopper 60 and upper and lower edge portions are clamped by the hydraulic clamps 25.

If the stamper 23 exchange and other maintenance operations have to be carried out, following operations will be taken.

First, the mold clamping unit 1 is set to a mold opening state to release the hydraulic clamps 25 and the locking means 26. At this time, the stopper pin 51 of the stopper mechanism 50 is projected to the fitting and releasing lines of the stationary mold 2. In this state, if the releasing handle 22a is pulled in the direction 904 in FIG. 6(the operation side of the mold clamping unit 1), then the stationary mold 2 slides on the guide rollers 24 to be pulled out from the molding position. When the stationary mold 2 comes to the guiding portion 40 according to this pulling operation, the locking means 26 is locked manually so that the stationary mold 2 can be held at the releasing position.

This holding operation can be easily executed because overrun of the stationary mold 2 can be prevented by the stopper pin 51 of the stopper mechanism 50 and because fall-down of the stationary mold 2 can be prevented by the projection 28 of the locking means 26.

The stationary mold 2 located at the releasing position is indicated by a chain double-dashed line in FIG. 6. Stamper exchange and/or other maintenance operations such as cleaning, abnormality inspection, etc. can be carried out on the stationary mold 2 which being held at this releasing position, and further this releasing position is selected on the guiding portion 40 which has little interference with other members. Therefore, such configuration can make above various operations easy.

After the operations are completed, the locking means 26 is released and the stationary mold 2 is restored to the molding position and then clamped by the hydraulic clamps 25, so that the stationary mold 2 can be ready for the normal operation. In addition, in the event that the stationary mold 2 is to be exchanged as a whole, under a condition where the hydraulic clamps 25 and the locking means 26 are released and the stopper pin 51 is retreated into the cylinder 52. the current stationary mold 2 can be pulled out from the molding position in the releasing direction (the direction 904 in FIG. 6) and then removed from the guiding portion 40. After the current stationary mold 2 is removed, a new stationary mold 2 is mounted on the guiding portion 40 and is then pushed until it abuts with the stopper 60 and as a result the new stationary mold 2 can be fitted into the stationary platen 3. If the new stationary mold 2 is clamped by the hydraulic clamps 25 at this position, it can be held at the molding position. In this event, since the new stationary mold 2 is positioned to abut to the stopper 60, it can be mounted to coincide its axial center with an axial center of the movable mold 9 even though it is set by manual operation.

In this fashion, the current stationary mold 2 can be exchanged with the new stationary mold 2. After exchange, the solenoid valve 55 is turned OFF to project the stopper pin 51 of the stopper mechanism 50 through the fitting and releasing line.

According to the mold clamping unit 1, the stationary mold 2 can be fitted and released easily by manual operation because it can slides on a plurality of guide rollers 24, 24, . . . .

The stationary mold 2 can be held stably by the hydraulic clamps 25 at the molding position. This holding operation can be further facilitated by automating holding operation of the stationary mold 2 by the hydraulic clamps 25.

Stamper exchange and/or other maintenance operations can be carried out on the stationary mold 2 after the stationary mold 2 is pulled out to the releasing position on the guiding portion 40 which has little interference with other members and is held by the locking means 26. Therefore, such operations can be executed easily while the worker has concerned portions in his or her sight.

Still further, since the locking means 26 is driven manually, incidental equipment such as pipings and/or wirings can be omitted. Hence, the mold clamping unit can be designed in a compact form at low cost.

In the first embodiment, although the mold attaching and detaching mechanism 20 has been provided to the stationary platen 3 side, it may be provided to the movable platen 10 side. In that case, the same explanations as the case of the stationary mold can be true of the movable mold and/or stamper exchange and maintenance operations.

Next, a second embodiment of the present invention will be explained with reference to FIGS. 7 to 10 hereinbelow.

Figure 7:
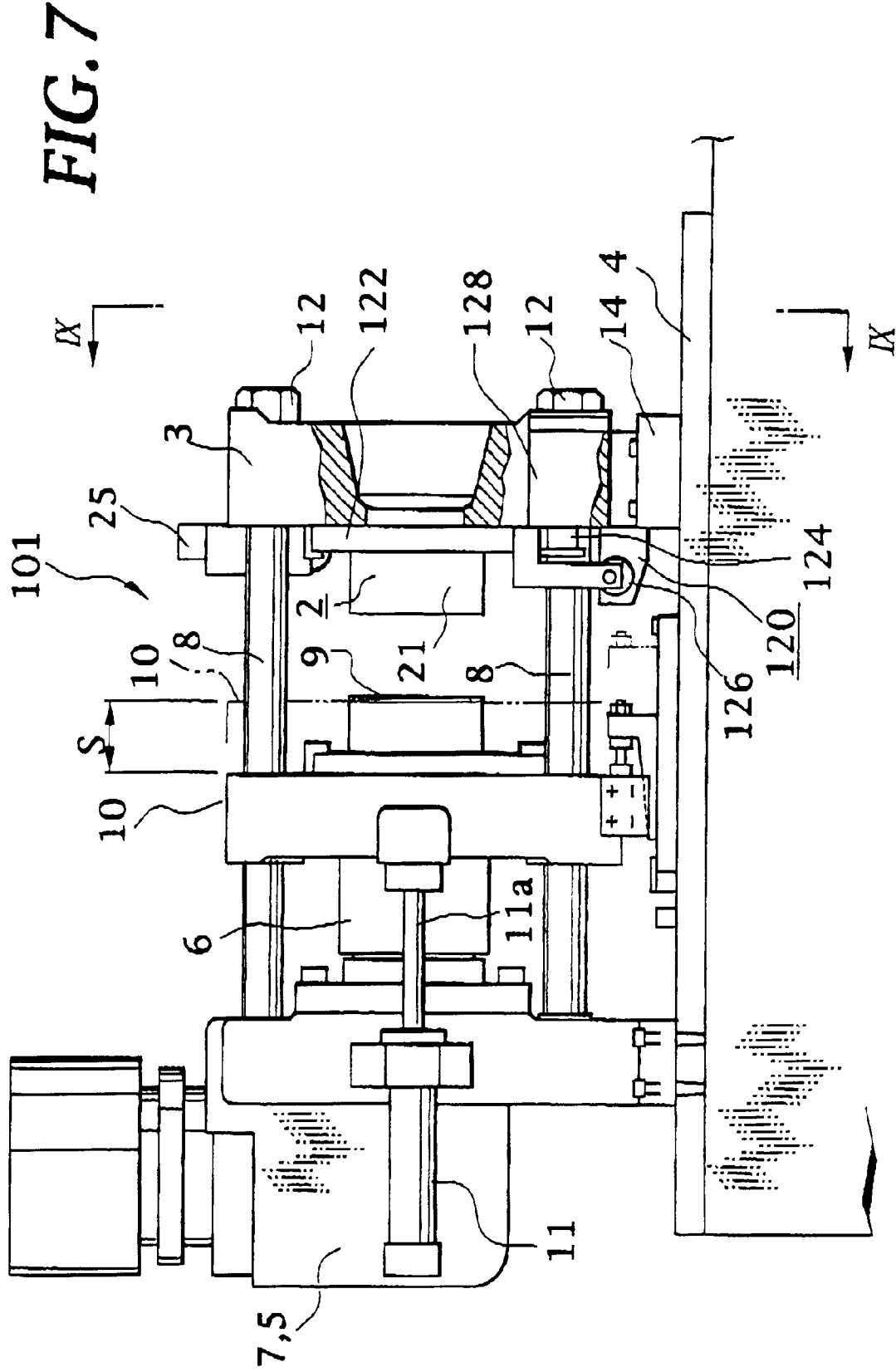
FIG. 7 is a side view, partially in section, showing a mold clamping unit according to a second embodiment of the present invention.
Figure 8:
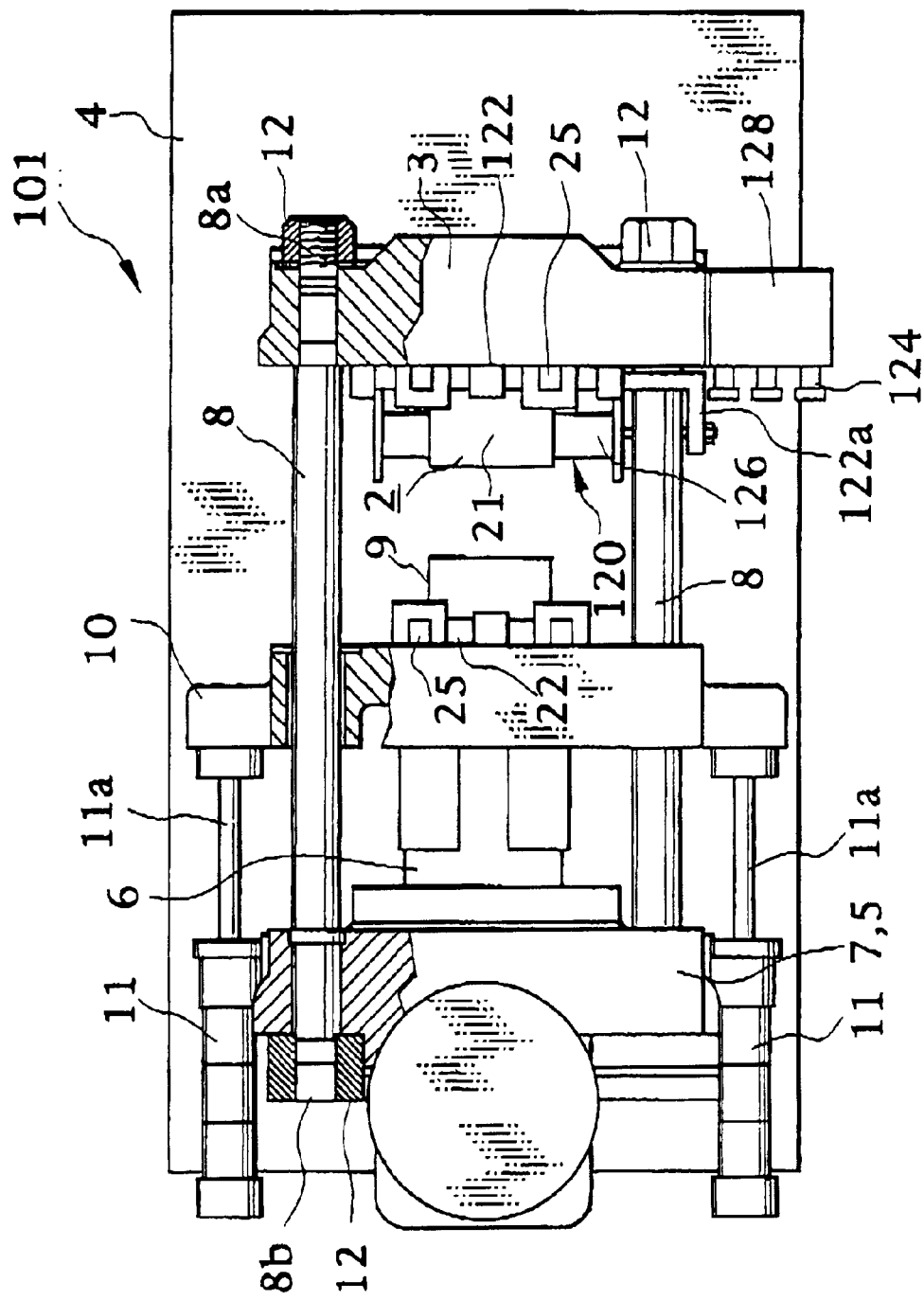
FIG. 8 is a plan view, partially in section, showing the mold clamping unit in FIG. 7.
Figure 9:
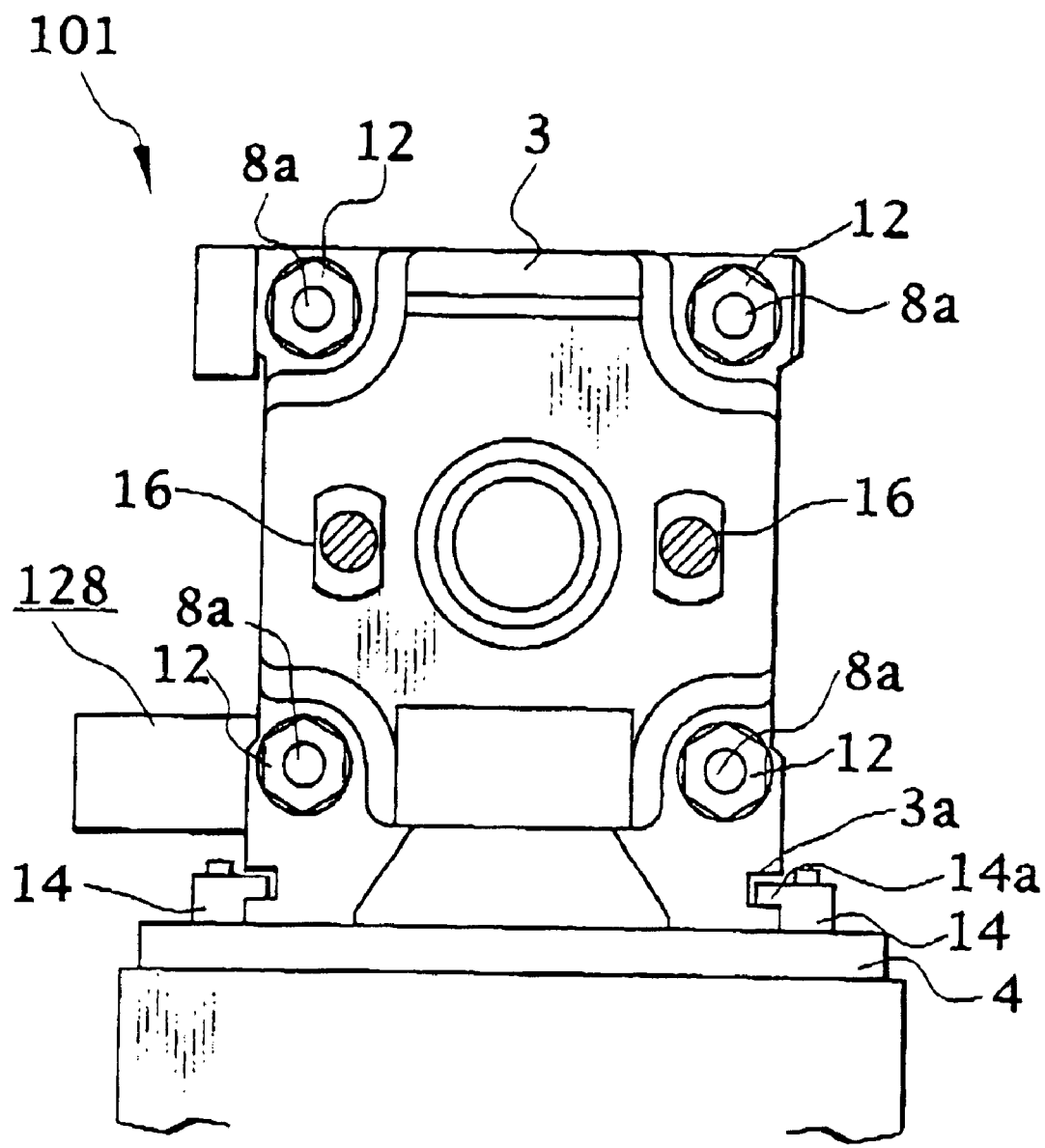
FIG. 9 is a sectional view showing the mold clamping unit taken along a line IX—IX in FIG. 7.

FIGS. 7 to 9 show a mold clamping unit 101 according to a second embodiment of the present invention wherein a stamper is attached on the stationary mold side. The same or similar reference numerals in the first embodiment are applied to the same or similar parts and elements in the second embodiment, and the description of the same or similar parts or elements will be omitted.

The mold clamping unit 101 comprises substantially, like the first embodiment, the stationary platen 3 for holding the stationary mold 2. the movable platen 10 for holding the movable mold 9, the cylinder support 7 in which the mold cylinder 5 is built, and the mold open-close cylinders 11 provided to the cylinder support 7.

The stationary platen 3 is equipped with a mold attaching and detaching mechanism 120, and the stationary mold 2 is held detachably by this mold attaching and detaching mechanism 120.

Figure 10:
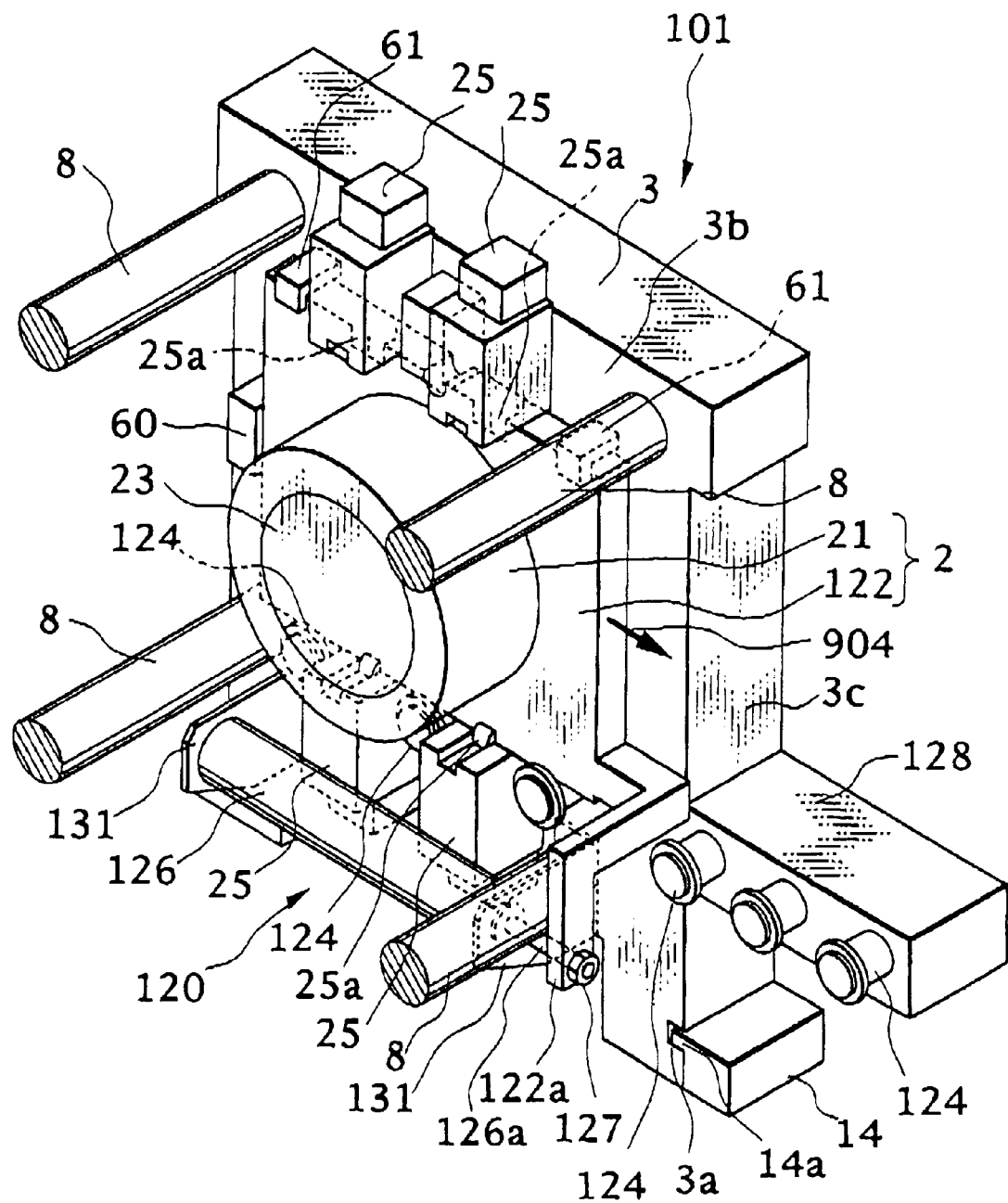
FIG. 10 is a perspective view showing a stationary platen on which a stationary mold is held in the mold clamping unit in FIG. 7.

As shown in FIG. 10, the mold attaching and detaching mechanism 120 comprises a plurality of guide rollers 124, 124, . . . provided on a surface 3b of the stationary platen 3 opposing the movable platen 10 along a direction substantially perpendicular to said open-close direction, hydraulic clamps 25, 25, . . . provided to upper and lower portions of the opposing surface 3b of the stationary platen 3 as a clamping means, for clamping detachably upper and lower edge portions of the stationary mold 2, and a moving cylinder 126 provided to the stationary platen 3, for connecting detachably the stationary mold 2 and shifting the stationary mold 2 along the guide rollers 124, 124, . . . .

The stationary mold 2 is made up of the mold main body 21, and a supporting plate 122 to which the mold main body 21 is attached. A connection arm 122a extends from a side edge portion of the supporting plate 122 to be connected to the moving cylinder 126 and also is bent to avoid interference with the tie-rods 8 and the guide rollers 124.

The moving cylinder 126 is provided lower than the lower tie-rods 8 in the vertical direction to avoid interference with the tie-rods 8. In other words, both end portions of the moving cylinder 126 are supported by brackets 131, 131 which are fixed to the stationary platen 3 at their base portions. A top end of a cylinder rod 126a is connected detachably to a connection arm 122a of the supporting plate 122 by a nut 127.

It is preferable that the mold attaching and detaching mechanism 120 is equipped with a guiding portion 128.

The guiding portion 128 extends from the side edge portion 3c of the stationary platen 3. which acts as the fitting and releasing side of the stationary mold 2, in the direction substantially perpendicular to the mold open-close direction. The guide rollers 124, 124, . . . are aligned on a side surface of the guiding portion 128.

Further preferably, the mold attaching and detaching mechanism 120 is equipped with a stopper 60.

In PIG. 10, a reference 61 denotes a guide member into which upper edge portions of the supporting plate 22 are fitted to guide movement of the stationary mold 2.

In the mold clamping unit 101 having the mold attaching and detaching mechanism 120 constructed as above, when the stamper 23 has to be exchanged to mold other molding products or a maintenance operation has to be carried out, such operations are executed in the following manner.

The stationary mold 2 is fixed to the stationary platen 3 in a mold opening state of the mold clamping unit 101, as shown in FIG. 10. The connection arm 122a and the cylinder rod 126a are fixed with a nut 127.

In this state, clamping of the fitting pawls 25a is released by retreating the fitting pawls 25a which clamp upper and lower edge portions of the supporting plate 122 by virtue of the hydraulic clamps 25, then the stationary mold 2 is moved from the main body side to the guiding portion 128 (in the direction 904, the operation side of the molding unit 101) by extending the cylinder rod 126a of the moving cylinder 126. This movement can be made smooth because of rotation of the guide rollers 124. The stationary mold 2 is pulled out from the molding position of the stationary platen 3 to the guiding portion 128 according to this movement.

After pulling-out of the stationary mold 2 is terminated, stamper exchange and/or maintenance operations will be carried out.

Subsequently, the cylinder rod 126a is pulled in by the moving cylinder 126. When the cylinder rod 126a is being pulled in, the fitting pawls 25a of the hydraulic clamps 25 are retreated into the hydraulic clamps 25 to release the stationary mold 2. According to pulling-in of the cylinder rod 126a, the stationary mold 2 is moved from the guiding portion 128 to the main body side while sliding on the guiding rollers 124 and is then positioned when the side edge portion of the supporting plate 122 abuts to the stopper 60. In this state, the fitting pawls 25a of the hydraulic clamps 25 are projected to clamp the upper and lower edge portions of the supporting plate 22, so that as shown in FIG. 10 the stationary mold 2 is held on the stationary platen 3. At this time, a new stamper 23 is attached to the mold main body 21 of the stationary mold 2 by a suitable absorption means (not shown).

If the stationary mold 2 is to be exchanged, it is first pulled out to the guiding portion 128 by the moving cylinder 126, then the connection arm 122a is disconnected from the cylinder rod 126a by removing the nut 127, and then it is detached from the stationary platen 3. After this detachment, a new stationary mold is mounted on the guide rollers 124 of the guiding portion 128 and the connection arm 122a and the cylinder rod 126a are fixed with the nut 127, then the new stationary mold is fitted to the stationary platen 3 by the moving cylinder 126 and is also clamped by the hydraulic clamps 25, whereby a mold exchange operation has been completed.

As explained above, according to this mold clamping unit 101, since fitting and releasing of the stationary mold 2 to and from the stationary platen 3 is automated with the use of the moving cylinder 126, ease in exchange operation of the mold 21 and/or the stamper 23 and maintenance operation can be achieved even if a wide gap cannot be assured between the stationary platen 3 and the movable platen 10 because of a small moving stroke S of the movable platen 10 in the mold opening state.

Since fitting start position and releasing end position of the stationary mold 2 to and from the stationary platen 3 are located on the guiding portion 128 which is remote from the main body of the stationary platen 3, the moving cylinder 126 can be more easily fixed to and removed from the stationary mold 2.

Further, since the stationary mold 2 is positioned by abutting to the stopper 60 and then mounted, it can be mounted so that its axial center coincides with an axial center of the movable mold 9 with precision. Therefore, the second embodiment can be applied suitably to the precision injection molding machine.

In the second embodiment, although the mold attaching and detaching mechanism 120 has been provided on the stationary platen 3 side, it may be provided on the movable platen 10 side.

In turn, a third embodiment of the present invention will be explained with reference to FIGS. 11 to 17 hereinbelow.

Figure 11:
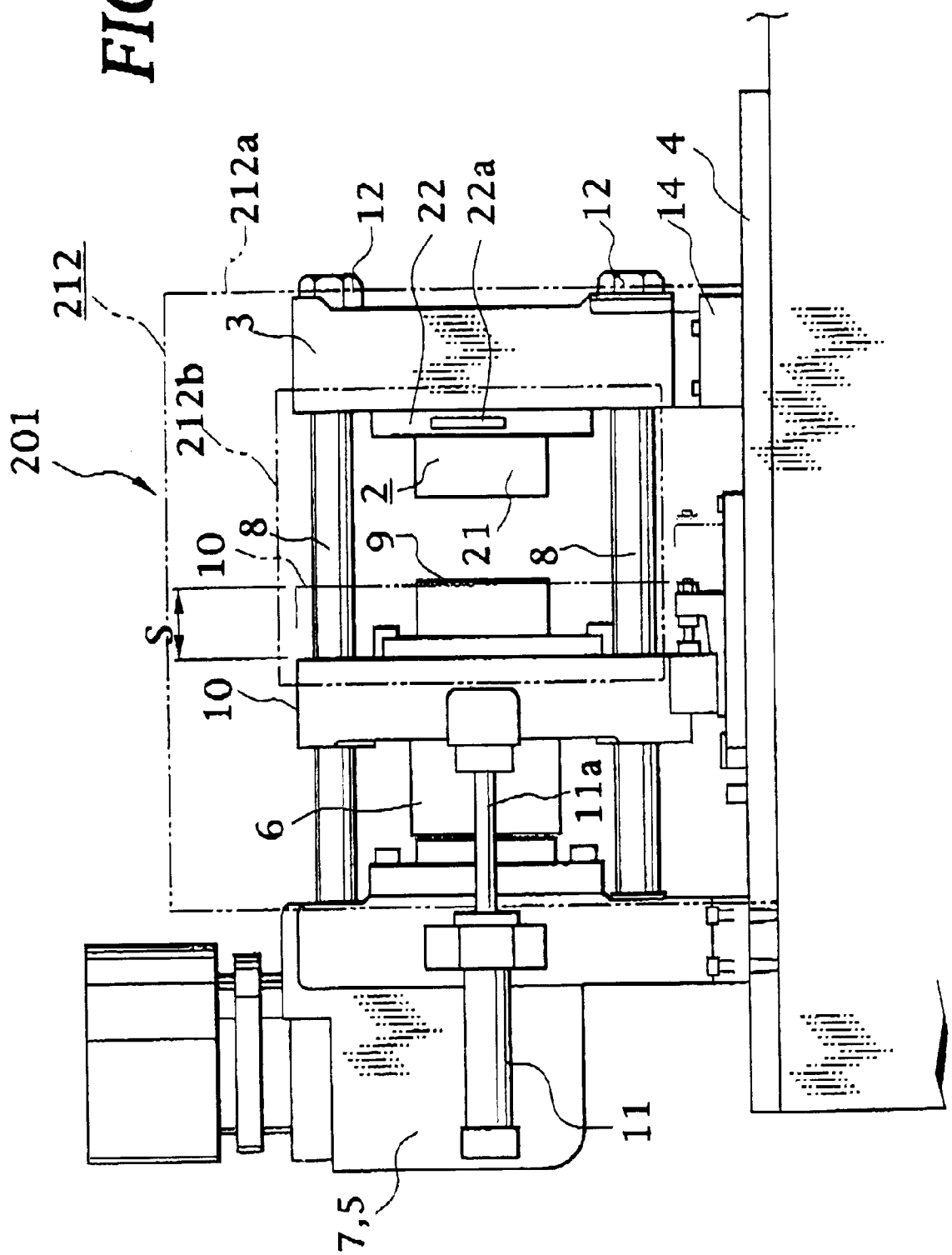
FIG. 11 is a side view showing operation side of a mold clamping unit according to a third embodiment of the present invention.

FIG. 11 shows a mold clamping unit 201 according to a third embodiment of the present invention wherein a stamper is attached to the stationary side. The same or similar reference numerals in the first embodiment are applied to the same or similar parts and elements in the third embodiment, and the description of the same or similar parts or elements will be omitted.

The mold clamping unit 201 comprises substantially, like the first embodiment, the stationary platen 3 for holding the stationary mold 2, the movable platen 10 for holding the movable mold 9, the cylinder support 7 in which the mold cylinder 5 is built, and the mold open-close cylinders 11 provided to the cylinder support 7.

In this mold clamping unit 201, an area between the stationary platen 3 and the cylinder support 7 is covered with a cover member 212. A side surface (side surface in FIG. 11) of the cover member 212 which covers an area between the stationary platen 3 and the movable platen 10 on the operator side is formed as a safety door 212a having a monitoring window 212b which is covered with a transparent member. Stamper exchange or maintenance operations can be effected via the safety door 212a when opened.

Figure 12:
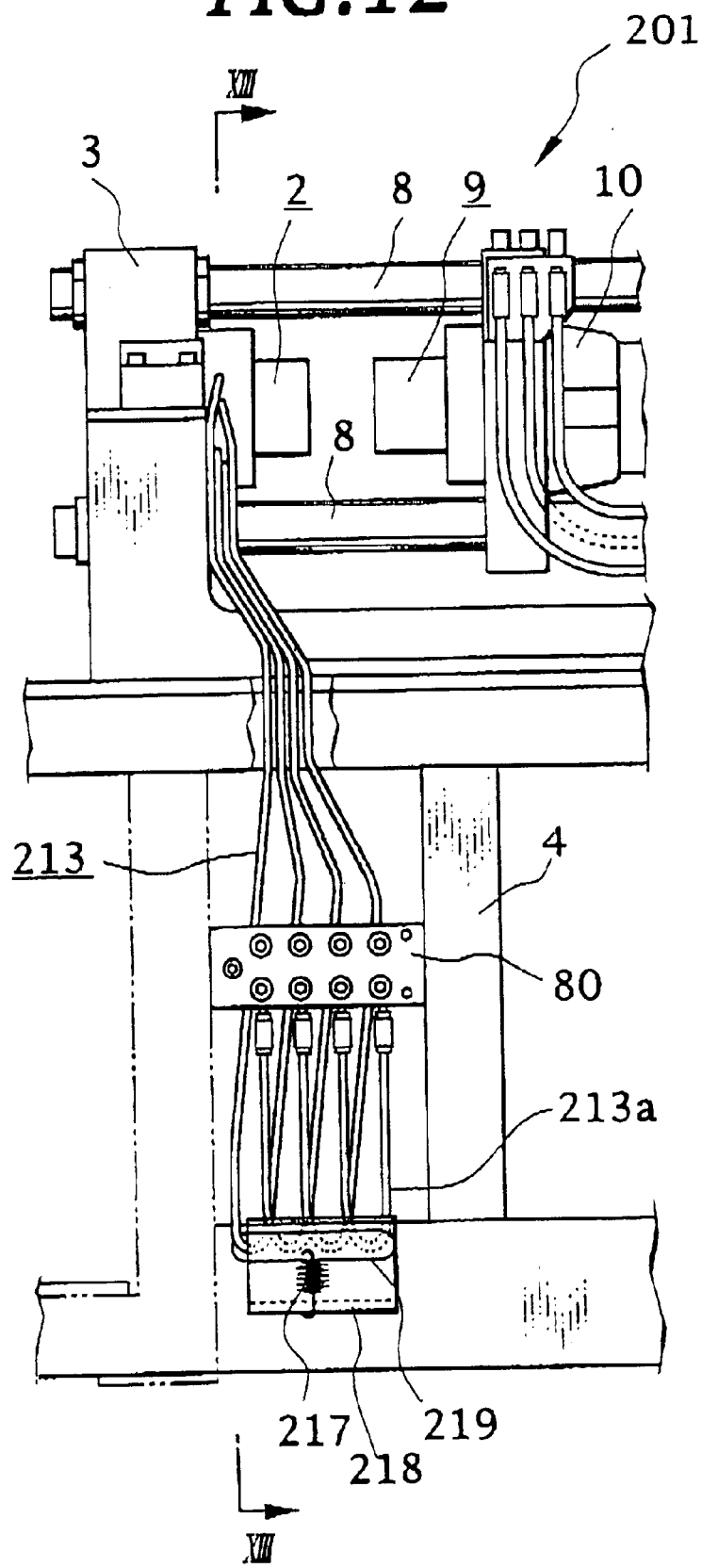
FIG. 12 is a side view showing a pertinent portion of non-operation side of the mold clamping unit in FIG. 11
Figure 13:
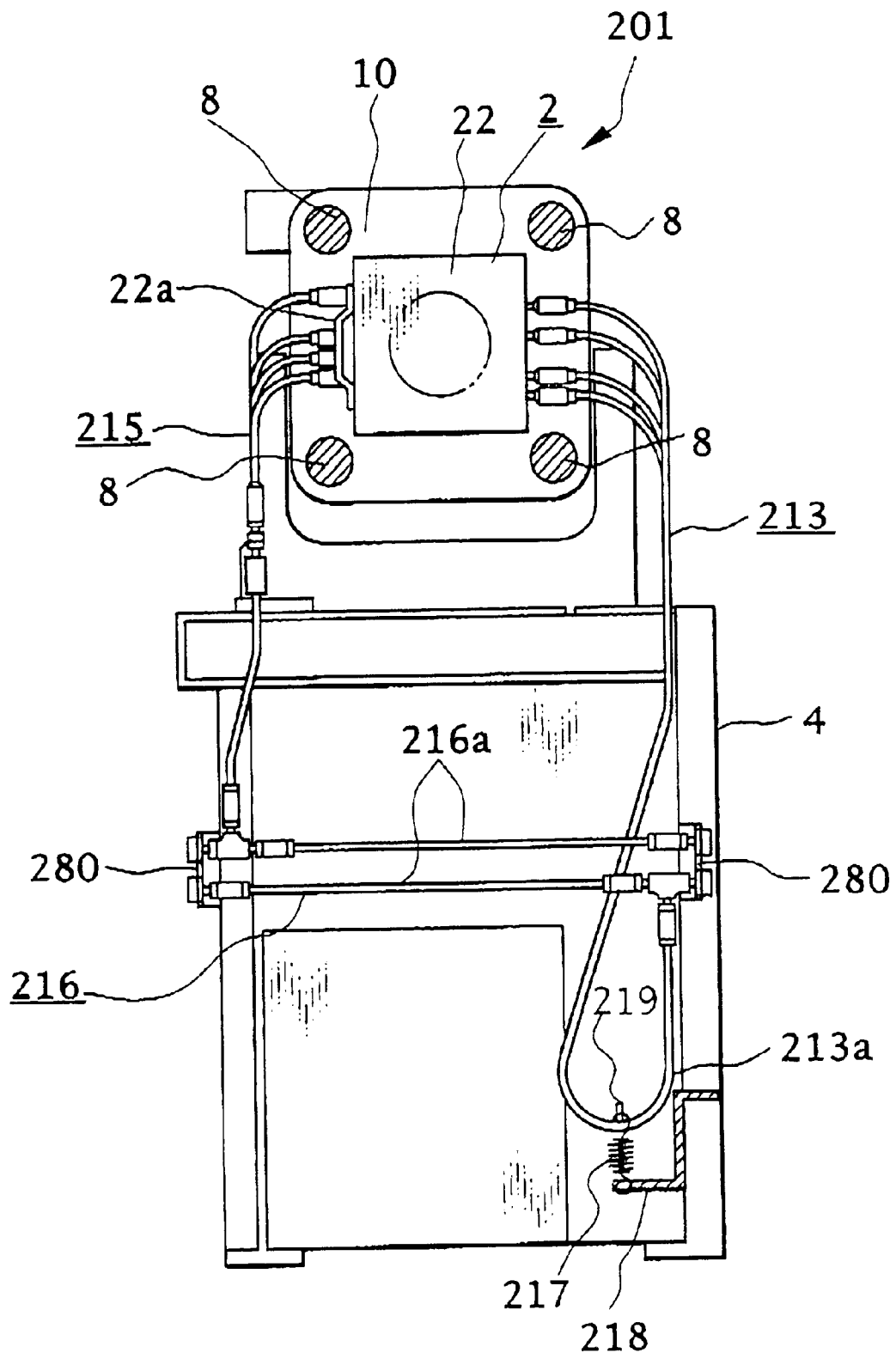
FIG. 13 is a sectional view showing the mold clamping unit taken along a line XIII—XIII in FIG. 12.

In the mold clamping unit 201, the stationary mold 2 is held by the mold attaching and detaching mechanism 20 on the stationary platen 3 slidably in the direction substantially perpendicular to the mold open-close direction whereas the movable mold 9 is attached to the movable platen 10 not to slide thereon. As shown in FIGS. 12 and 13, flexible hoses 213 and 215 for controlling temperature of the mold are connected to the stationary mold 2 and the movable mold 9. At this time, the flexible hoses 213 and 215 consist of a plurality of hoses (four hoses in this embodiment) in which input sides and output side are combined with each other respectively.

The flexible hose 213 is connected to the stationary mold 2 and is also connected to a piping system 216 which is provided to the frame 4 with having slack 213a in the middle portion. A spring 217 is provided between the flexible hose 213 and the frame 4 to absorb the slack 213a. The flexible hose 215 is connected to the movable mold 9 and is connected to a piping system 216 without above slack. The spring 217 is made up of an extension spring. One end of the spring 217 is engaged with a bracket 218 fixed to an lower end portion of the frame 4, while the other end of the spring 217 is engaged with a connection member 219 which is connected to intermediate portions of the plural hoses constituting the flexible hose 213. The slack 213a can be absorbed by pulling the flexible hose 213 by a spring force to keep it in an appropriate tension state.

At this time, the slack 213a is designed to have a slack amount corresponding to a maximum slide amount of the stationary mold 2. The spring 217 is also designed to have a spring force to such an extent that resistance to sliding the stationary mold 2 is not so enhanced.

Figure 14A:
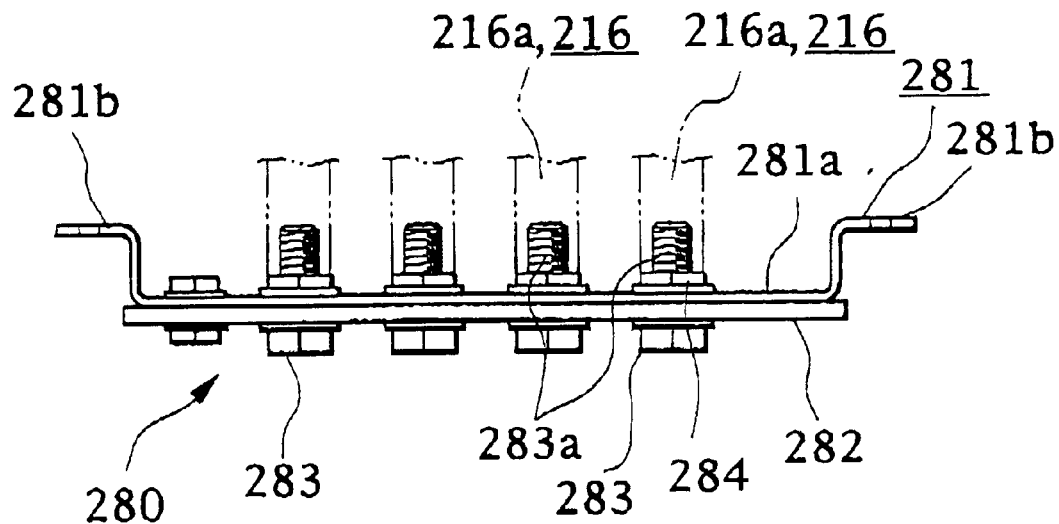
FIG. 14A is a plan view showing a supporting member in a piping system used in the mold clamping unit in FIG. 11.
Figure 14B:
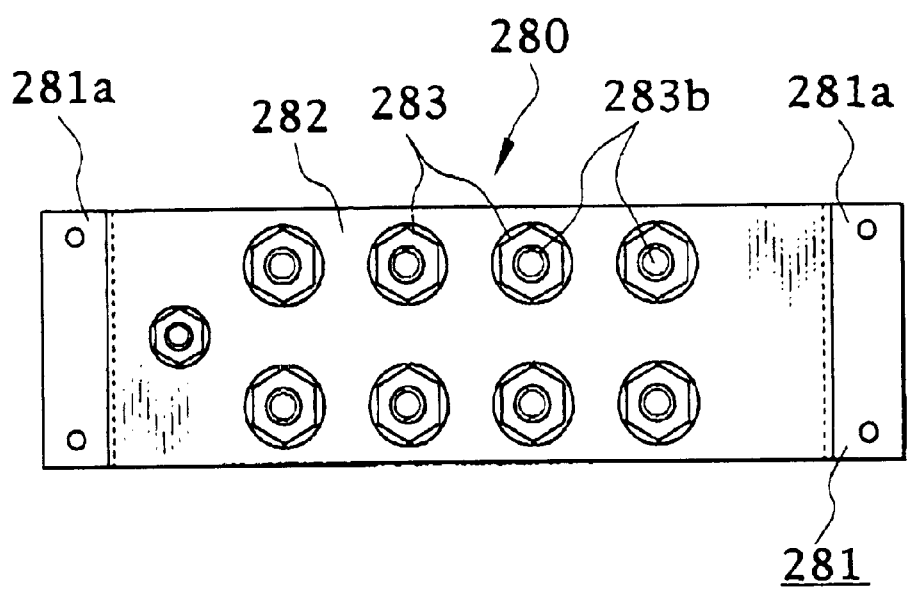
FIG. 14B is a front view showing the supporting member in the piping system used in the mold clamping unit in FIG. 11.

As shown in FIG. 13, the piping system 216 is provided in a compact manner such that both ends of respective pipings 216a, 216a, are supported by the supporting members 280 which are fixed to lower portions of the frame on the operation side and non-operation side respectively. At this time, as shown in FIGS. 14A and 14B, each of the supporting members 280 comprises a steel plate 281 in which fitting brackets 281b are provided on both sides of a central U-shaped recess portion 281a. a thermal insulating plate 282 for covering an outer surface of the U-shaped recess portion 281a of the steel plate 281, and a joint 283 for tightening the steel plate 281 and the thermal insulating plate 282 together with a nut 284. In this manner, the supporting members 280 are formed to have thermal insulating material surfaces (thermal insulating plates 282).

The supporting members 280 are attached to the frame 4 via the fitting brackets 281b to direct the thermal insulating plates 282 outwardly. Respective pipings 216a, 216a, are supported if pipings are connected by screwing ends thereof into thread portions 283a of the joints 283 (see FIG. 14A). The joints 283 are formed to have hollow portions 283b being passed through in the axial direction (see FIG. 14B).

In such fitting structure of the piping system 216, since a fitting area of the piping system 216 is protected with the thermal insulating material surfaces (thermal insulating plates 282), a surface of the fitting area can be prevented from increasing in temperature even if temperature control medium flowing through the piping system 216 is at high temperature. As a result, safety in operation and improvement in operation efficiency can be achieved.

The supporting members 280 may be constituted only by the thermal insulating plates 282 if necessary strength can be obtained.

In this event, advantages similar to those in the fitting structure of the piping system 216 described above can be achieved.

Figure 15:
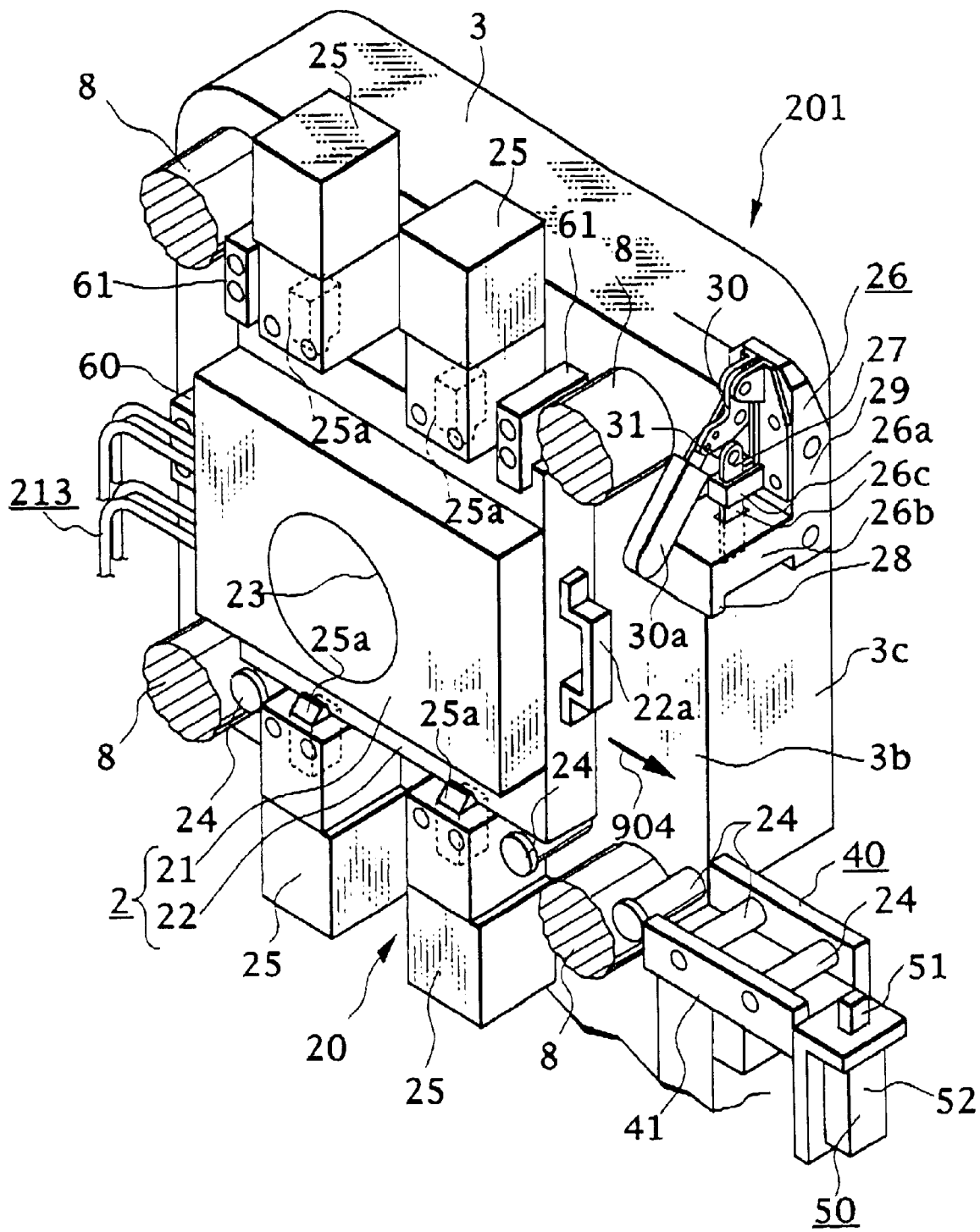
FIG. 15 is a perspective view showing a mold attaching and detaching mechanism used in the mold clamping unit in FIG. 11
Figure 16:
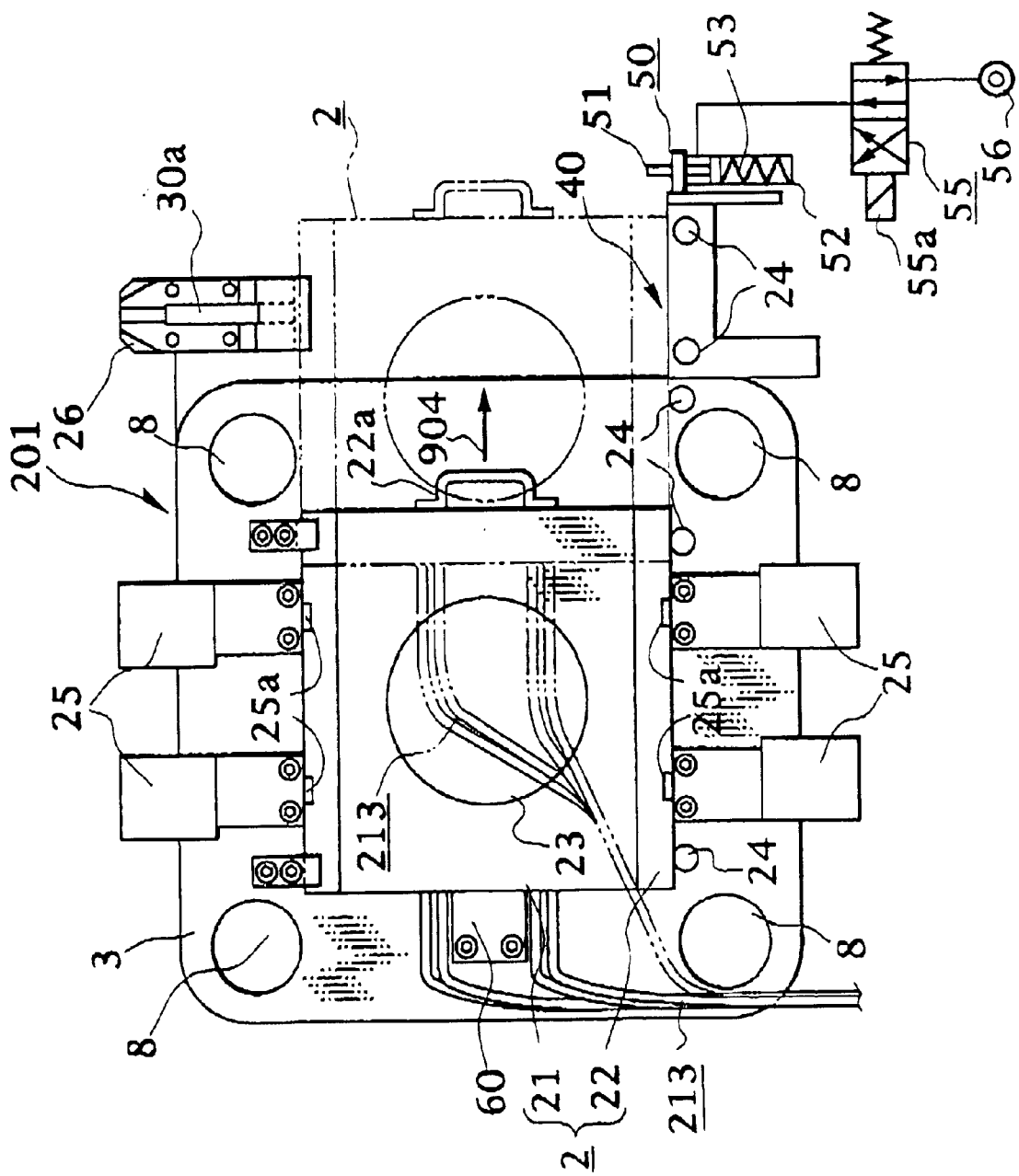
FIG. 16 is a view illustrating an operation of the mold attaching and detaching mechanism in FIG. 15.

The mold attaching and detaching mechanism 20 has a structure similar to that in the first embodiment and therefore the description can be omitted (see FIG. 15).

In the mold clamping unit 201 as constructed as above, fitting and releasing of the stationary mold 2 can be done while the flexible hose 213 is connected to the stationary mold 2 when there is necessity of carrying out exchange of the stamper 23 and/or other maintenance operations. Therefore, coupling and uncoupling operations of the flexible hose 213 to and from the stationary mold 2 can be neglected in fitting and releasing the stationary mold 2. For this reason, stamper exchange and maintenance operations can be made still more easily.

More particularly, the flexible hose 213 has a maximum slack amount when the stationary mold 2 is fitted into the molding position in normal operation. The flexible hose 213 is provided to avoid interference with other members by pulling the flexible hose 213 by virtue of the spring 217 to absorb this slack amount (see FIGS. 12 and 13). When the stationary mold 2 is pulled out from the molding position to the releasing position, the flexible hose 213 is pulled out against a tensile force of the spring 217 to reduce the slack amount (see a chain double-dashed line in FIG. 16). On the contrary, when the stationary mold 2 is fitted in from the releasing position to the molding position, the flexible hose 213 is pulled in according to the tensile force of the spring 217 to increase the slack amount. In this manner, since the tensile force of the spring 217 is always applied to the flexible hose 213 when the stationary mold 2 is slid upon fitting and releasing, slack of the flexible hose 213 which causes interference with other members inadvertently can be avoided, so that smooth slide of the stationary mold 2 can be assured.

Figure 17:
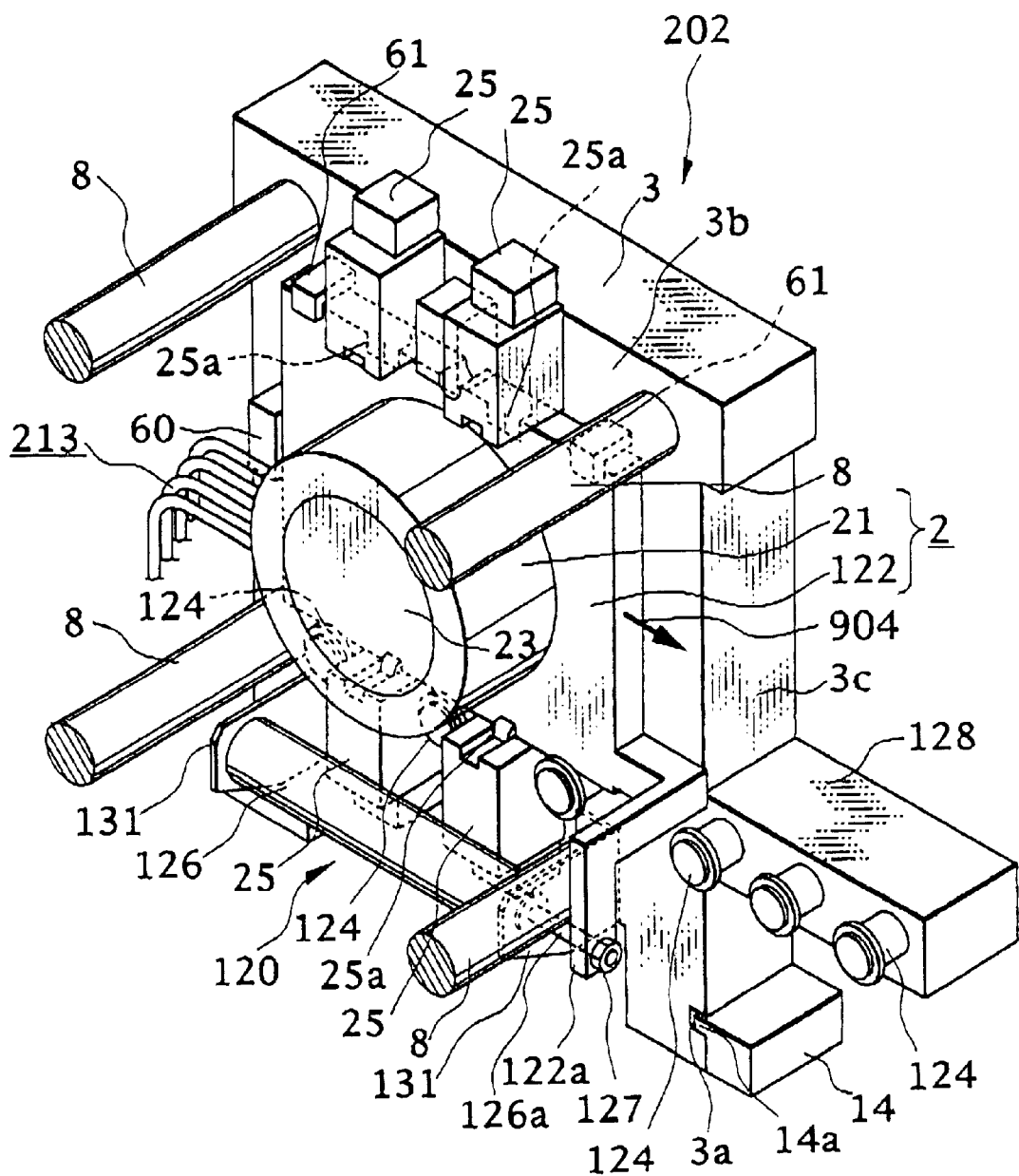
FIG. 17 Is a perspective view showing a mold clamping unit to which the mold attaching and detaching mechanism in the second embodiment is applied in place of the mold attaching and detaching mechanism in FIG. 15.

FIG. 17 shows a structure wherein the flexible hose 213 is provided to the mold clamping unit 202 having the mold attaching and detaching mechanism 120 of the second embodiment. In this event, since fitting and releasing of the stationary mold 2 can be done while the flexible hose 213 is being connected to the stationary mold 2, like the mold attaching and detaching mechanism 20 described above, stamper exchange and maintenance operations can be made easy further more.

In the third embodiment, although the mold attaching and detaching mechanism 20 or 120 has been provided to the stationary platen 3 side, it may be provided to the movable platen 10 side. In that case, the same explanations as the case of the stationary mold can be true of the movable mold and/or stamper exchange and maintenance operations.

In the third embodiment, the stationary mold 2 has been pulled out to the operation side of the mold clamping unit 201 or has been fitted from the operation side of the same. Conversely, the stationary mold 2 may be pulled out to the non-operation side of the mold clamping unit 201 or may be fitted from the non-operation side of the same. In this case, the flexible hose 213 for controlling mold temperature will be connected to the operation side of the mold.

Subsequently, a fourth embodiment of the present invention will be explained with reference to FIGS. 18 to 26 hereinbelow.

Figure 18:
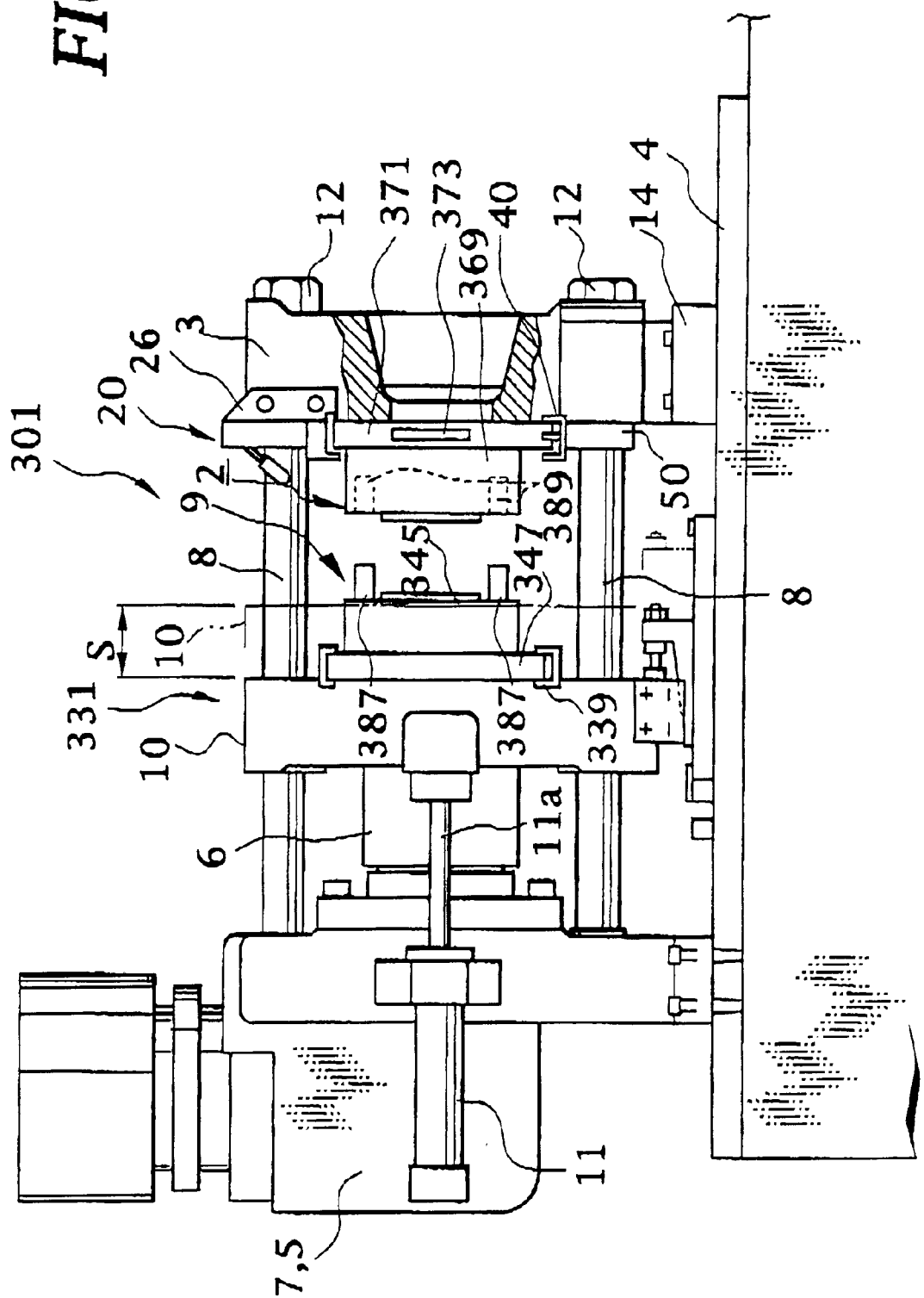
FIG. 18 is a side view, partially in section, showing a mold clamping unit according to a fourth embodiment of the present invention.
Figure 19:
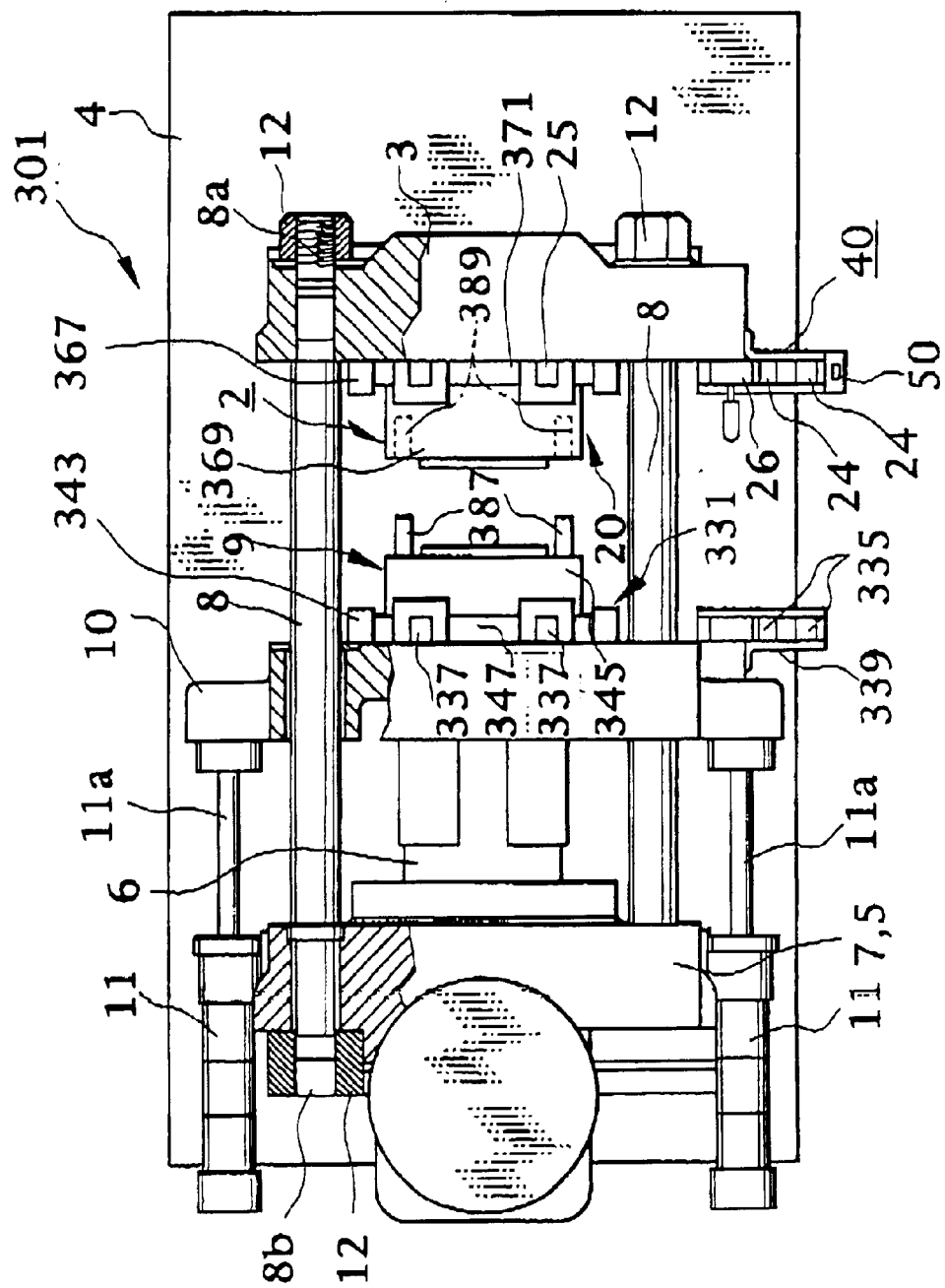
FIG. 19 is a plan view, partially in section, showing the mold clamping unit in FIG. 18.

FIGS. 18 and 19 show a mold clamping unit 301 according to a fourth embodiment of the present invention wherein a stamper is attached to the stationary mold side. The same or similar reference numerals in the first embodiment are applied to the same or similar parts and elements in the fourth embodiment, and the description of the same or similar parts or elements will be omitted.

The mold clamping unit 301 comprises substantially, like the first embodiment, the stationary platen 3 for holding the stationary mold 2, the movable platen 10 for holding the movable mold 9, the cylinder support 7 in which the mold cylinder 5 is built, and the mold open-close cylinders 11 provided to the cylinder support 7.

Figure 20:
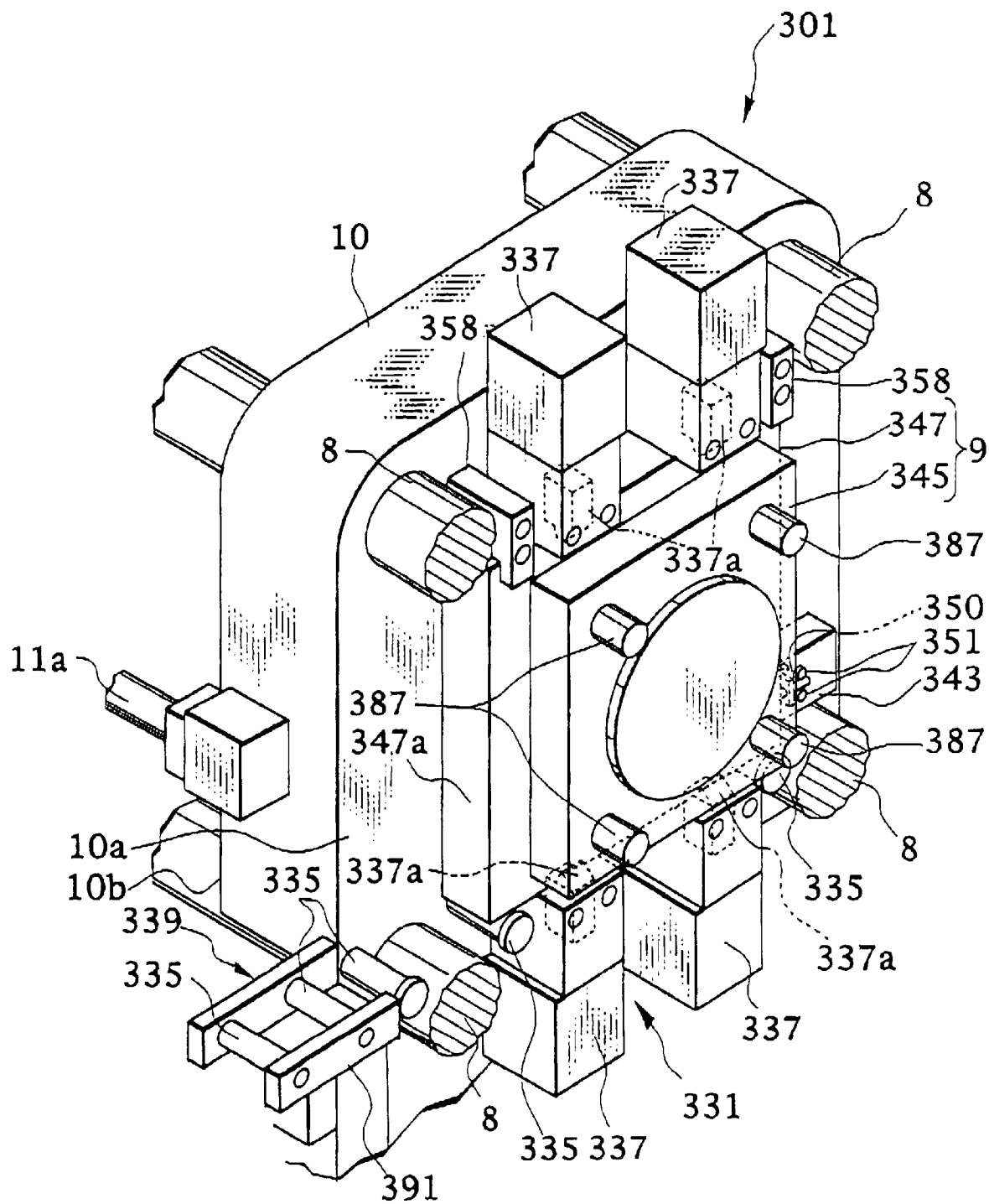
FIG. 20 is a perspective view showing a movable platen on which a movable mold is held in the mold clamping unit in FIG. 18.
Figure 21:
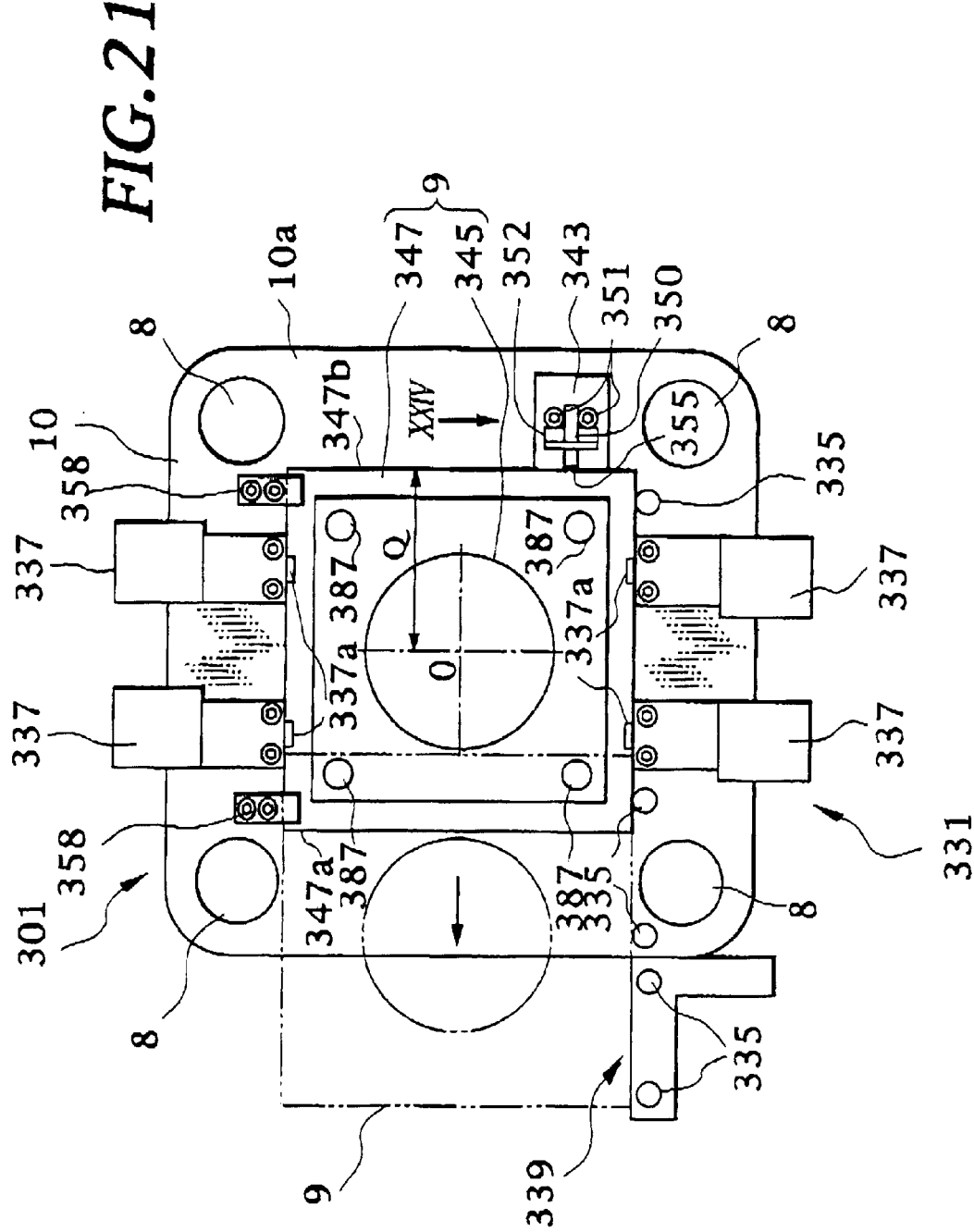
FIG. 21 is a view showing illustrating an operation of the mold clamping unit in FIG. 18 in a state where a stationary mold is omitted upon introducing a mold.
Figure 22:
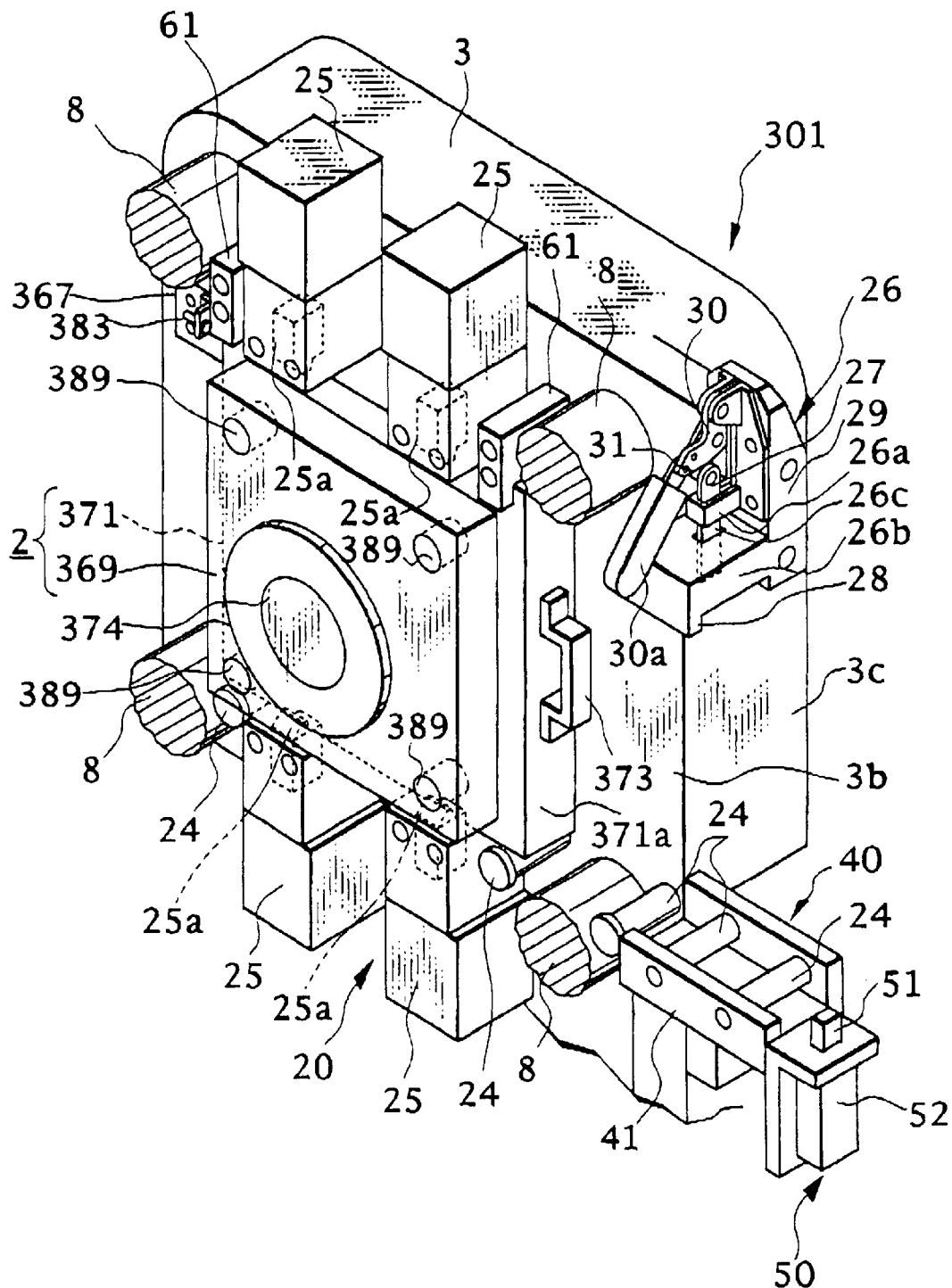
FIG. 22 is a perspective view showing a stationary platen on which a stationary mold is held in the mold clamping unit in FIG. 18.
Figure 23:
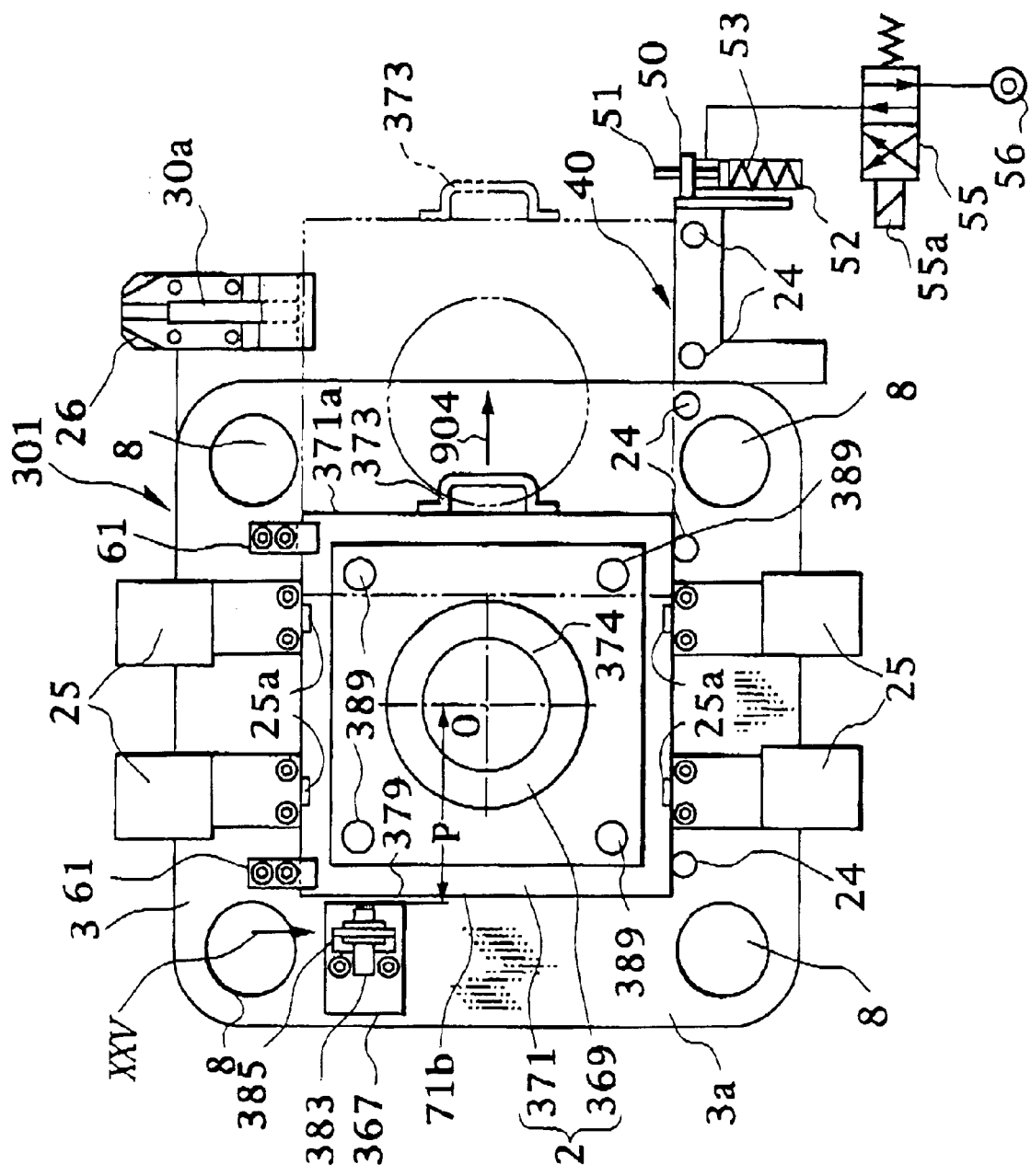
FIG. 23 is a view showing illustrating an operation of the mold clamping unit in FIG. 18 when a stationary mold is introduced.

As shown in FIGS. 20 and 21, a mold attaching and detaching mechanism 331 which hold the movable mold 9 slidably in the horizontal direction substantially perpendicular to the mold open-close direction is provided to the movable platen 10. On the other hand, as shown in FIGS. 22 and 23, a mold attaching and detaching mechanism which hold the stationary mold 2 slidably in the direction substantially perpendicular to the mold open-close direction is provided to the stationary platen 3.

As shown in FIG. 20, the mold attaching and detaching mechanism 331 on the movable platen 10 side comprises a plurality of guide rollers 335 provided on a surface 10a of the movable platen 10 opposing the stationary platen 3 along the horizontal direction substantially perpendicular to the mold open-close direction, for guiding releasing and fitting of the movable mold 9, hydraulic clamps 337 provided to the movable platen 10 as a clamping means, for clamping the movable mold 10 at a molding position, a guiding portion 339 projected from a lower side edge portion 10b of the movable platen 10, which serves as a releasing and fitting side for the movable mold, in the horizontal direction substantially perpendicular to the mold open-close direction, and a positioning stopper 343 provided on a lower portion of the surface 10a of the movable platen 10 opposing to the stationary platen 3, for limiting a moving limit of the movable mold 9 to be fitted by abutting to the movable mold 9.

The movable mold 9 is made up of a mold main body 345, and a supporting plate 347 to which the mold main body 345 is fixed.

Figure 24:
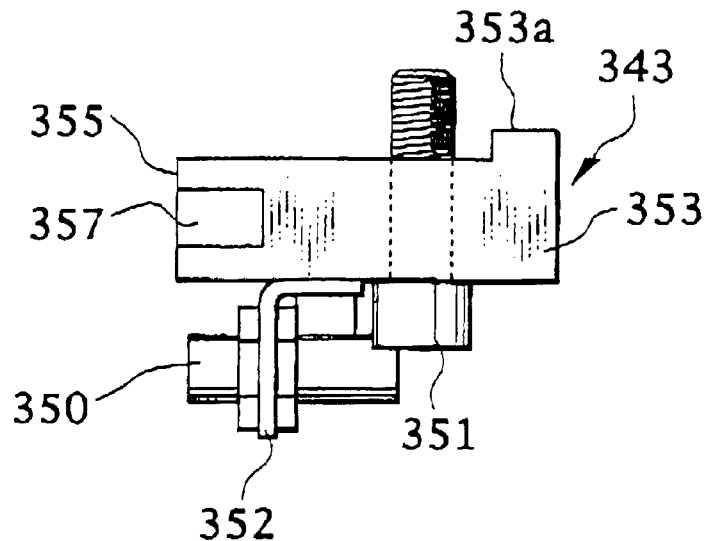
FIG. 24 is a view showing a positioning stopper on the movable platen side when viewed from an arrow XXIV in FIG. 21.

The positioning stopper 343 serving as a first stopper may position the mold at a regular molding position. As shown in FIG. 24 indicated by an arrow XXIV in FIG. 21, the positioning stopper 343 consists of a stopper main body 353 which is fixed to the movable platen 10 with a bolt 351, and a magnet 357 buried in part of the contact surface 355 abutting to other side edge portion 347b of the supporting plate 347. The contact surface 355 abutting to other side edge portion 347b is formed as a flat surface by simultaneously working the stopper main body 353 and the magnet 357. In the positioning stopper 343, a projection 353a is formed on a fitting surface of the stopper main body 353 fitted to the movable platen 10 on the opposite side to the contact surface 355. After the projection 353a is inserted into a recess portion (not shown) formed on the movable platen 10, the positioning stopper 343 is fixed with a bolt 351.

A proximity switch 350 is provided on the stopper main body 353 via a fitting bracket 352 on the insertion side of the bolt 351. The proximity switch 350 may detect fitting of the movable mold 9 to enable clamping operation by the hydraulic clamps 337.

In FIG. 20, a reference 358 denotes a guiding member to which an upper edge portion of the supporting plate 347 to guide movement of the movable mold 9. The guiding member 358 is formed to have a L-shape to project from the opposing surface 10a of the movable platen 10.

In FIG. 22, the stationary mold 3 is composed of a mold main body 369, and a supporting plate 371 to which the mold main body 369 is fixed. A releasing handle 373 is provided on one side edge portion 371a of the supporting plate 371 on the mold releasing side, and a stamper 374 is mounted on a front surface of the mold main body 369.

Figure 25:
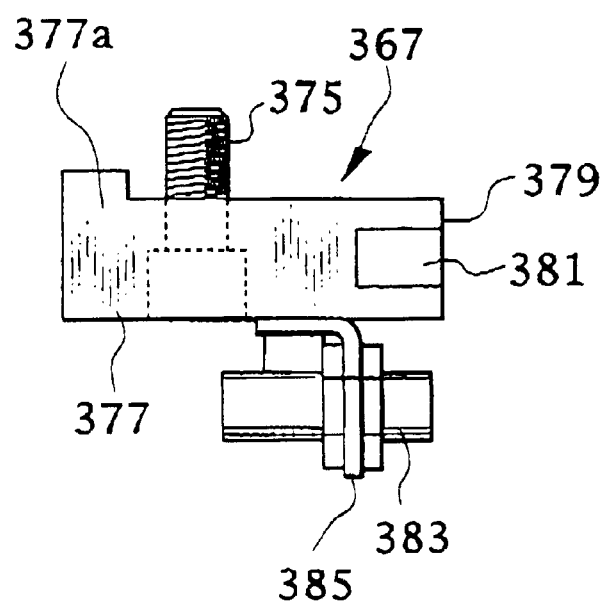
FIG. 25 is a view showing a temporal positioning stopper on the stationary platen side when viewed from an arrow XXV in FIG. 23.

The temporarily positioning stopper 367 serving as a second stopper is provided on an upper portion on the opposing surface 3a of the stationary platen 3 opposing to the movable platen 10 and may temporarily position the stationary mold 2 by limiting a moving limit of the stationary mold 2 when the stationary mold 2 is set after exchange of the stamper 374 or mold maintenance operation. As shown in FIG. 25 indicated by an arrow XXV in FIG. 23, the positioning stopper 367 consists of a topper main body 377 which is fixed to the stationary platen 3 with a bolt 375, and a magnet 381 buried in part of the contact surface 379 abutting to other side edge portion 371b of the supporting plate 371. The contact surface 379 abutting to other side edge portion 371b is formed as a flat surface by simultaneously working the stopper main body 377 and the magnet 381. In the temporarily positioning stopper 367, a projection 377a is formed on a fitting surface of the stopper main body 377 fitted to the stationary platen 3 on the opposite side to the contact surface379. After the projection 377a is inserted into a recess portion (not shown) formed on the stationary platen 3. the positioning stopper 367 is fixed with a bolt 375.

A position of the contact surface 379 of the temporarily positioning stopper 367 is set such that a distance P of the stationary mold 2 at a regular molding position, indicated by a solid line in FIG. 23, from a mold center O is longer slightly, e.g., about 0.5 mm, than a distance Q of the movable mold 9 at a regular molding position, indicated by a solid line in FIG. 21, from the mold center O to a position of the contact surface 355 of the positioning stopper 343.

A proximity switch 383 is provided on the stopper main body 377 via a fitting bracket 385 on the insertion side of the bolt 375. The proximity switch 383 may detect fitting of the stationary mold 2 to enable clamping operation by the hydraulic clamps 25.

In FIGS. 18 and 19, guide pins 387 are provided at four corners on an opposing surface of the movable mold 9 opposing to the stationary mold 2 of the mold main body 345 to project to the stationary mold 2. On the contrary, guide holes 389 in which the guide pins 387 are inserted are formed on the mold main body 369 of the stationary mold 2 at positions opposing to the guide pins 387. The guide pins 387 and the guide holes 389 constitute a centering mechanism for centering the stationary mold 2 and the movable mold 9. During a centering operation by the centering mechanism, the movable mold 9 is positioned by the positioning stopper 343 and clamped by the hydraulic clamps 337 while the stationary mold 2 is positioned by the temporarily positioning stopper 367 but not clamped by the hydraulic clamps 25.

In FIG. 20, the hydraulic clamps 337 of the mold attaching and detaching mechanism 331 are provided on upper and lower portions on the opposing surface 10a of the movable platen 10 respectively. Fitting pawls 337a are provided to project and retreat by hydraulics The movable mold 9 is held at a molding position of the movable platen by clamping the upper and lower edge portions of the supporting plate 347 by the projected pawls 337a. The upper hydraulic clamps 337 for clamping the upper edge portion of the supporting plate 347 are provided between the tie-rods 8, 8 whereas the lower hydraulic clamps 337 for clamping the lower edge portion of the supporting plate 347 are provided between the guide rollers 335, 335.

The hydraulic clamps 337 are provided to automate attaching and detaching of the movable mold 9, and other automatically clamping means such as electromagnetic clamps may be employed in place of the hydraulic clamps 337 if they have above function. The electromagnetic clamps can automate attaching and detaching of the movable mold 9 by virtue of excitation and deexcitation.

The guiding portion 339 consists of a groove portion 391 having U-shape, and guide rollers 335 provided between both side walls of the groove portion 391. The guiding portion 339 is projected to direct its groove direction along the direction substantially perpendicular to the mold open-close direction.

In FIG. 22, the mold attaching and detaching mechanism 20 on the stationary mold 3 side has a similar structure to that in the first embodiment and therefore the detailed description thereof will be omitted.

In the mold clamping unit 301 constructed as above, under conditions where the stationary mold 2 and the movable mold 9 are coupled with each other, i.e., the guide pins 387 of the movable mold 9 are inserted into the guide holes 389 of the stationary mold 2 to centering the movable mold 9 and the stationary mold 2 and the movable platen 10 is moved close to the stationary platen 3 such that the stationary mold 2 and the movable mold 9 can be set on the guiding portions 40, 339 respectively, fitting of the mold is carried out. In this state, the mold is pushed in and positioned by abutting other side edge portion 347b of the supporting plate 347 of the movable mold 9 to the positioning stopper 343. In this state, the mold is positioned at a regular molding position and the supporting plate 347 tightly contact to the positioning stopper 343 by means of the magnet 357 provided on the contact surface 355.

If the mold is positioned and the proximity switch 383 detects the stationary mold 2 and the proximity switch 350 detects the movable mold 9 respectively, the hydraulic clamps 25, 337 are operated to fix the stationary mold 2 and the movable mold 9 by clamping upper and lower portions of the supporting plates 371, 347 respectively in above description sequence. Since the movable mold 9 is attracted by the magnet 357 up to clamping, displacement of the movable mold 9 from the regular molding position can be prevented so that clamping of the molds at the molding positions can be made firmly. In addition, since the contact surface 355 to contact the supporting plate 347 of the movable mold 9 is formed as a flat surface by simultaneously working the magnet 357 and the stopper main body 353. the positioning stopper 343 can provide extremely high positioning precision.

If exchange of the stamper 374 fixed to the stationary mold 2 and other maintenance operations such as cleaning, abnormality inspection, etc. of the mold have to be carried out, following operations will be taken.

First, the mold clamping unit 301 is set to a mold opening state until the guide pins 387 provided on the mold main body 345 of the movable mold 9 are pulled out from the guide holes 389 provided on the mold main body 369 of the stationary mold 2, and the hydraulic clamps 25 and the locking means 26 are released. At this time, the stopper pin 51 of the stopper mechanism 50 is projected to the fitting and releasing lines of the stationary mold 2. In this state, if the releasing handle 373 is pulled in the direction 904 in FIG. 23 (operation side of the mold clamping unit 301), then the stationary mold 2 slides on the guide rollers 24 to be pulled out from the molding position. When the stationary mold 2 comes to the guiding portion 40 by this pulling operation, the locking means 26 is locked by manual operation so that the stationary mold 2 can be held at the releasing position indicated by a chain double-dashed line in FIG. 23.

Exchange of the stamper 374 and/or other maintenance operations can be carried out on the stationary mold 2 while being held at this releasing position. Since this releasing position is selected on the guiding portion 40 which has little interference with other members, above operations can be facilitated.

After the operations being completed, the locking means 26 is released and the stationary mold 2 which is set on the guide rollers 24 indicated by the chain double-dashed line in FIG. 23 is pushed forward (in the left direction in FIG. 23). Thus the stationary mold 2 is temporarily positioned by rendering other side edge portion 371b of the supporting plate 371 to abut to the contact surface 379 of the temporarily positioning stopper 367. The stationary mold 2 indicated by a solid line in FIGS. 22 and 23 does not contact to the temporarily positioning stopper 367 and centered at a regular molding position. In a temporarily positioned state, the proximity switch 383 detects the stationary mold 2 to permit clamping operation by the hydraulic clamps 25.

The position of the contact surface 379 of the temporarily positioning stopper 367 is set such that a distance P of the stationary mold 2 at a regular molding position, indicated by a solid line in FIG. 23, from a mold center O is longer slightly, e.g., about 0.5 mm, than a distance Q of the movable mold 9 at a regular molding position, indicated by a solid line in FIG. 21, from the mold center O to a position of the contact surface 355 of the positioning stopper 343. Hence, the position of the stationary mold 2 in temporarily positioning is displaced forward rather than the regular molding position by about 0.5 mm in the fitting direction of the stationary mold 2 (i.e., in the left direction in FIG. 23).

In this state, the movable platen 10 is advanced to the stationary mold 3 by operating the mold open-close cylinder 11 to thus close the mold. At this time, the guide pins 387 provided on the mold main body 345 of the movable mold 9 are inserted into the guide holes 389 provided on the mold main body 369 of the stationary mold 2. As a result, the stationary mold 2 which is temporarily positioned to abut to the temporarily positioning stopper 367 is separated from the temporarily positioning stopper 367 against an attractive force of the magnet 381 and is moved slightly in the right direction in FIG. 23. Thus the stationary mold 2 comes to a position indicated by a solid line in FIG. 23, i.e., at the regular molding position, so that axial centers of the stationary mold 2 and the movable mold 9 coincide with each other.

Since the stationary mold 2 which is temporarily positioned is separated from the magnet 381 of the temporarily positioning stopper 367 upon centering the stationary mold 2 and the movable mold 9, maintenance operation of the temporarily positioned state and moving operation of the stationary mold 2 from the temporarily positioned state to coincide axial centers can be made precisely and clamping of the molds at the molding positions is assured.

After centering of the stationary mold 2 and the movable mold 9, the hydraulic clamps 25 are operated with respect to the stationary mold 2 and the upper and lower portions of the supporting plate 371 are clamped. Thus the stationary mold 2 can be fixed at the regular molding position.

In this fashion, the stationary mold 2 is temporarily positioned to the movable mold 9 which is fixed at the regular molding position by the hydraulic clamps 337, and the axial center of the stationary mold 2 being temporarily positioned is caused to coincide with the axial center of the movable mold 9 by the centering mechanism. Since centering the stationary mold 2 and the movable mold 9 is carried out as above, scoring of the mold in molding can be avoided and also molding operation can be effected with good precision.

Figure 26:
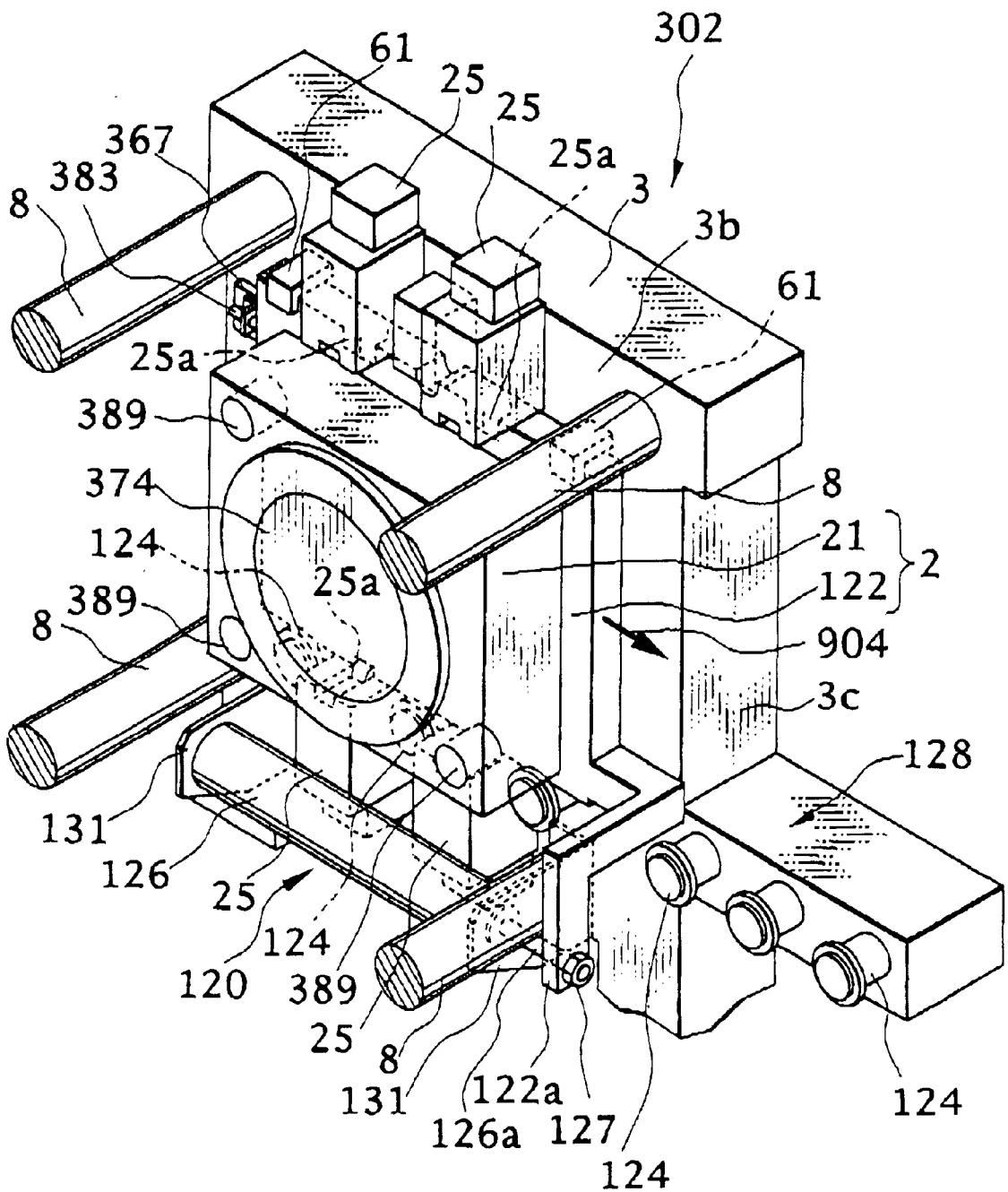
FIG. 26 is a perspective view showing a mold clamping unit to which the mold attaching and detaching mechanism in the second embodiment is applied in place of the mold attaching and detaching mechanism in FIG. 22.

FIG. 26 shows a structure wherein a centering mechanism is provided to the mold clamping unit 302 having the mold attaching and detaching unit 120 on the stationary platen 3 side of the second embodiment in this case, because centering the stationary mold 2 and the movable mold 9 is executed as described above, scoring of the mold in molding can also be avoided and further molding operation can also be executed precisely.

In the fourth embodiment, the stamper 374 being provided on the stationary mold 2 side may be provided on the movable mold 9 side. In this event, the positioning stopper 343 must be provided on the stationary mold 3 side and the tempolarly positioning stopper 367, the locking means 26 and the stopper mechanism 50 must be provided on the movable platen 10 side.

In addition, the hydraulic cylinder may be employed instead of the positioning stopper 343 having the magnet 357 to position the mold. Still further, the centering mechanism consisting of the guide pins 387 and the guide holes 389 may be formed of cotters which are made up of concave portions and convex portions, both having inclined surfaces.

What is claimed is:

1. A mold clamping unit comprising:

a stationary platen for holding a stationary mold;

a movable platen for holding a movable mold, the movable platen being arranged in opposition to the stationary platen;

open-close mechanism for moving the movable platen toward and away from the stationary platen in an open-close direction;

a mold clamping mechanism on at least one of the platens for clamping a corresponding one of the molds, as the molds are closed by the open-close mechanism; and a mold attachment mechanism associated with said at least one of the platens for detachably attaching the corresponding one of the molds in a molding position to said at least one of the platens, and allowing movement of the corresponding mold from the molding position in a crossing direction transverse to the open-close direction;

the mold attachment mechanism comprising:

a guiding mechanism extending from a lower portion of said one of the platens in a direction substantially perpendicular the open-close direction, for supporting the corresponding mold from below, to guide the corresponding mold while drawn out from the molding position and fitted into the molding position;

a clamping mechanism provided at upper and lower portions of said one of the platens for clamping upper and lower edge portions of the corresponding mold at the molding position; and a locking mechanism provided at said one of the platens to lock the corresponding mold drawn out from the molding position at a released position.

2. A mold clamping unit according to claim 1, further comprising:

a piping system for fluid to control mold temperature provided on a frame in which the stationary platen and the movable platen are arranged in opposition to each other;

a flexible hose for connecting the corresponding mold and the piping system, having slack in a mid portion thereof, and a spring means provided between the flexible hose and the frame for absorbing the slack.

3. A mold clamping unit according to claim 1, wherein said one of the platens has a guiding portion on a side edge portion thereof serving as fitting and releasing sides of the corresponding mold, the guiding portion extends in the substantially perpendicular crossing direction to the direction of the open-close action, the guiding mechanism comprises a plurality of guide rollers mounted on the guiding portion, and the locking mechanism is provided on an upper portion of the corresponding platen in opposition to the guiding portion.

4. A mold clamping unit according to claim 3, wherein the mold attachment mechanism has a stopper pin provided on a projected end side of the guiding portion, the pin prevents overrun of the corresponding mold exceeding the releasing position by projecting on a releasing and fitting line of the corresponding mold, and permits releasing and fitting of the corresponding mold by withdrawal from the releasing and fitting line.

5. A mold clamping unit according to claim 1, wherein the locking mechanism has a lock pin and a projection portion, the lock pin is vertically moveable manually, so as to abut to an upper edge surface of the corresponding mold positioned at the releasing position when the lock pin moves downwardly, and to hold the corresponding mold in its downwardly pressed state, and the projection portion prevents fall-down of the corresponding mold at the releasing position.

6. A mold clamping unit according to claim 1, wherein said one of the platens has a stopper provided thereon to limit fitting movement of the corresponding mold by abutting side edge portion of the corresponding mold.

7. A mold clamping unit according to claim 1, wherein the mold attachment mechanism further comprises a mold displacing mechanism provided at said one of the platens and connected detachably to the corresponding mold, for shifting the corresponding mold along the guiding mechanism.

8. A mold clamping unit according to claim 7, wherein the guiding mechanism comprises a plurality of guide rollers.

9. A mold clamping unit according to claim 7, wherein the clamping mechanism comprises one of a hydraulic clamp and an electromagnetic clamp.

10. A mold clamping unit according to claim 8, wherein said one of the platens has a guiding portion on a side edge portion thereof for carrying out and carrying in the corresponding mold, the guiding portion extends in the substantially perpendicular crossing direction to the direction of the open-close action; and the plurality of guiding rollers are mounted on the guiding portion.

11. A mold clamping unit according to claim 7, wherein said one of the platens has a stopper thereon to limit movement of the corresponding mold by abutting a side edge portion of the corresponding mold as the corresponding mold is fitted.

12. A mold clamping unit according to claim 7, wherein the mold displacing mechanism and the locking mechanism comprise a cylinder.

13. A mold clamping unit comprising:

a stationary platen for holding a stationary mold;

a movable platen for holding a movable mold, the movable platen being arranged in opposition to the stationary platen;

an open-close mechanism for moving the movable platen toward and away from the stationary platen in an open-close direction;

a mold clamping mechanism on at least one of the platens for clamping a corresponding one of the molds as the molds are closed by the open-close mechanism; and a mold attachment mechanism associated with said at least one of the platens for detachably attaching the corresponding one of the molds in a molding position to said at least one of the platens, and allowing movement of the corresponding mold from the molding position in a crossing direction transverse to the open-close direction;

a piping system for fluid to control mold temperature provided on a frame in which the stationary platen and the movable platen are arranged in opposition to each other;

a flexible hose for connecting the corresponding mold and the piping system, having slack in a mid portion thereof; and spring means provided between the flexible hose and the frame and biasing the flexible hose in a direction transverse to the open-close direction and the crossing direction for absorbing the slack.

14. A mold clamping unit according to claim 13, wherein the mold attachment mechanism comprises:

a guiding mechanism extending from a lower portion of said one of the platens in the crossing direction for supporting the corresponding mold from below, so as to guide the corresponding mold during carrying out and carrying into the molding position;

a clamping mechanism provided for upper and lower portions of said one of the platens, for clamping upper and lower edge portions of the corresponding mold at the molding position; and a mold displacing mechanism provided at said one of the platens and connected detachably to the corresponding mold, for shifting the corresponding mold along the guiding mechanism.

15. A mold clamping unit according to claim 13, wherein the piping system is provided on the frame via a supporting member which has a thermal insulating material surface.

16. A mold clamping unit comprising:

a stationary platen for holding a stationary mold;

a movable platen for holding a movable mold, the movable platen being arranged in opposition to the stationary platen;

an open-close mechanism for moving the movable platen toward and away from the stationary platen in an open-close direction;

a mold clamping mechanism on at least one of the platens for clamping a corresponding one of the molds, as the molds are closed by the open-close mechanism; and a pair of mold attachment mechanisms, one of the pair associated with each of the platens for detachably attaching a corresponding mold in a molding position to the platen, and allowing a movement of the corresponding mold from the molding position in a crossing direction transverse to the open-close direction;

a first positioning stopper provided at one of the platens, for limiting movement of one mold by abutment with a side edge portion of the one mold as the one mold is fitted;

a second positioning stopper provided for the other of the platens for temporarily limiting movement in a fitting direction of the other mold in advance of the molding position of the other mold by abutment with a side edge portion of the other mold, as the other mold is fitted, the other mold being spaced from the second positioning stopper at the molding position; and a centering mechanism for centering the one and other molds by moving said other mold to the molding position when the movable platen is advanced to the stationary platen while said one mold is positioned by the first positioning stopper, and held by the mold attachment mechanism at the molding position and said other mold is positioned temporarily by the second positioning stopper.

17. A mold clamping unit according to claim 16, wherein the first positioning stopper includes a magnet on part of a contact surface thereof to abut the side edge portion of said one mold the magnet being flush with the contact surface.

18. A mold clamping unit according to claim 16, wherein the second positioning stopper includes a magnet on part of a contact surface thereof to abut the side edge portion of said other mold.

19. A mold clamping unit according to claim 16, wherein the centering mechanism comprises a guide pin projecting from said one mold and a guide hole on the other mold, and the guide pin is inserted into the guide hole so that the molds are centered when the movable platen is advanced to the stationary platen.

20. A mold clamping unit comprising:

a stationary platen for holding a stationary mold, a movable platen for holding a movable mold, the movable platen being arranged in opposition to the stationary platen;

an open-close mechanism for moving the movable platen toward and away from the stationary platen in an open-close direction;

a mold clamping mechanism on at least one of the platens for clamping a corresponding one of the molds, as the molds are closed by the open-close mechanism; and a pair of mold attachment mechanisms, one of the pair associated with each of the platens for detachably attaching a corresponding mold in a molding position to the platen, and allowing a movement of the corresponding mold from the molding position in a crossing direction transverse to the open-close direction;

a first positioning stopper provided at one of the platens, for limiting movement of one mold by abutment with a side edge portion of the one mold as the one mold is fitted;

a second positioning stopper provided for the other of the platens for temporarily limiting movement in a fitting direction of the other mold, in advance of the molding position of the other mold, by abutment with a side edge portion of the other mold as the other mold is fitted;

a centering mechanism for centering the one and the other of the molds by moving said other mold to the molding position when the movable platen is advanced to the stationary platen while said one mold is positioned by the first positioning stopper, and held by the mold attachment mechanism at the molding position, and said other mold is positioned temporarily by the second positioning stopper, one of the mold attachment mechanisms comprising:

a guiding mechanism extending from a lower portion of one of the platens in a direction substantially perpendicular the open-close direction, for supporting the corresponding mold from below, to guide the corresponding mold while drawn out from the molding position and fitted into the molding position;

a clamping mechanism provided at upper and lower portions of said one of the platens for clamping upper and lower edge portions of the corresponding mold at the molding position; and a locking mechanism provided at said one of the platens to lock the corresponding mold drawn out from the molding position at a releasing position.

* * * * *